(12) United States Patent
Ko et al.

(10) Patent No.: US 11,775,103 B2
(45) Date of Patent: Oct. 3, 2023

(54) TOUCH SENSING DISPLAY DEVICE WITH INTEGRATED MULTIPLEXED ANTENNA FUNCTION

(71) Applicant: Samsung Display Co., Ltd., Yongin-si (KR)

(72) Inventors: Gwang Bum Ko, Yoning-si (KR); Heon Seok Lee, Yoning-si (KR); Hyun Jae Lee, Yongin-si (KR); So Young Park, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 171 days.

(21) Appl. No.: 17/167,055

(22) Filed: Feb. 3, 2021

(65) Prior Publication Data

US 2021/0303122 A1 Sep. 30, 2021

(30) Foreign Application Priority Data

Mar. 31, 2020 (KR) .................. 10-2020-0038959

(51) Int. Cl.
*G06F 3/041* (2006.01)
*H01Q 1/24* (2006.01)

(52) U.S. Cl.
CPC ........ *G06F 3/04164* (2019.05); *G06F 3/0412* (2013.01); *G06F 3/04144* (2019.05); *H01Q 1/243* (2013.01)

(58) Field of Classification Search
None
See application file for complete search history.

(56) References Cited

U.S. PATENT DOCUMENTS

| | | | |
|---|---|---|---|
| 9,325,072 B2 | 4/2016 | Oh et al. | |
| 2017/0139520 A1 | 5/2017 | Yeh et al. | |
| 2019/0081387 A1 | 3/2019 | Pandya et al. | |
| 2019/0220123 A1* | 7/2019 | Kanaya | G06F 3/04164 |
| 2019/0302939 A1 | 10/2019 | Hong et al. | |
| 2019/0361549 A1* | 11/2019 | Gu | G06F 3/044 |

FOREIGN PATENT DOCUMENTS

| | | |
|---|---|---|
| KR | 10-1632237 | 6/2016 |
| KR | 10-2019-0029429 | 3/2019 |
| KR | 10-2019-0069226 | 6/2019 |
| KR | 10-2019-0115132 | 10/2019 |

* cited by examiner

*Primary Examiner* — Amare Mengistu
*Assistant Examiner* — Sarvesh J Nadkarni
(74) *Attorney, Agent, or Firm* — H.C. Park & Associates, PLC

(57) ABSTRACT

A display device includes a first sensing cell located in a display area; a first sensing line extending toward a non-display area from the first sensing cell; a second sensing cell most adjacent to the first sensing cell in a first direction in the display area; a second sensing line extending toward the non-display area from the second sensing cell; a multiplexer located in the non-display area, the multiplexer is connected to the first sensing line, the multiplexer is not connected to the second sensing line; a first pad connected to the multiplexer through a first multiplexer line; and a second pad connected to the second sensing line.

17 Claims, 25 Drawing Sheets

TOUCH SENSING DISPLAY DEVICE WITH INTEGRATED MULTIPLEXED ANTENNA FUNCTION

CROSS-REFERENCE TO RELATED APPLICATION

This application claims priority from and the benefit of Korean Patent Application No. 10-2020-0038959 filed on Mar. 31, 2020, which is hereby incorporated by reference for all purposes as if fully set forth herein.

BACKGROUND

Field

Exemplary embodiments of the invention relate generally to a display device and, more specifically, to the display device with an antenna being mounted in a bezel-less display area and a driving method thereof.

Discussion of the Background

With the development of information technologies, the importance of a display device which is a connection medium between a user and information increases. Accordingly, display devices such as a liquid crystal display device, an organic light emitting display device, and a plasma display device are increasingly used.

A display device may include pixels and display an image by using the pixels. Also, the display device may include sensing cells overlapping with the pixels on a plane and sense a touch input of a user by using a change in capacitance of the sensing cells.

Recently, according to preference of users, display devices have been released with improved aesthetics by decreasing a non-display area, e.g., a bezel area in which any pixel is not located. A bezel may be eliminated in the case of a display device having a bended display panel in which pixels are disposed even at a side of the display panel.

In a typical display device, an antenna for wireless communication is generally mounted in a bezel area. Also, in the typical display device, mechanical buttons for power-on/off and sound volume tuning are generally mounted in the bezel area.

Therefore, it is difficult to mount an antenna and mechanical buttons in a narrow-bezel display device or a bezel-less display device.

The above information disclosed in this Background section is only for understanding of the background of the inventive concepts, and, therefore, it may contain information that does not constitute prior art.

SUMMARY

One or more exemplary embodiments of the inventive concepts provide a display device in which an antenna can be mounted in a display area even when no bezel exists, as well as a driving method of the display device.

One or more exemplary embodiments of the inventive concepts also provide a display device in which a pressure sensor can be mounted in a display area even when no bezel exists, as well as a driving method of the display device.

Additional features of the inventive concepts will be set forth in the description which follows, and in part will be apparent from the description, or may be learned by practice of the inventive concepts.

According to one or more exemplary embodiments of the invention, a display device includes a first sensing cell located in a display area; a first sensing line extending toward a non-display area from the first sensing cell; a second sensing cell most adjacent to the first sensing cell in a first direction in the display area; a second sensing line extending toward the non-display area from the second sensing cell; a multiplexer located in the non-display area, the multiplexer is connected to the first sensing line, the multiplexer is not connected to the second sensing line; a first pad connected to the multiplexer through a first multiplexer line; and a second pad connected to the second sensing line.

According to one or more exemplary embodiments, the display device may further include a third pad connected to the multiplexer through a second multiplexer line; a wireless communication controller connected to the third pad; and a touch controller connected to the first pad and the second pad.

According to one or more exemplary embodiments, the display device may further include a third sensing cell most adjacent to the second sensing cell in the first direction in the display area; and a third sensing line extending toward the non-display area from the third sensing cell. The multiplexer may not be connected to the third sensing line.

According to one or more exemplary embodiments, a length of the first sensing cell in the first direction may be equal to a length of the third sensing cell in the first direction, and a length of the first sensing cell in a second direction may be equal to a length of the third sensing cell in the second direction. The first direction and the second direction may be different from each other.

According to one or more exemplary embodiments, a length of the second sensing cell in the second direction may be shorter than a length of the first sensing cell in the second direction.

According to one or more exemplary embodiments, the first sensing cell may include a plurality of sub-cells. At least two of the sub-cells may have different shapes.

According to one or more exemplary embodiments, the sub-cells may be arranged in the second direction different from the first direction.

According to one or more exemplary embodiments, the display device may further include a third sensing cell most adjacent to the first sensing cell in the opposite direction of a second direction; and a third sensing line extending from the third sensing cell, the third sensing line being connected to the multiplexer. An area of the third sensing cell may be greater than an area of the first sensing cell. A distance between the third sensing cell and the multiplexer may be greater than a distance between the first sensing cell and the multiplexer.

According to one or more exemplary embodiments, the first sensing cell may include a plurality of first sub-cells. At least two of the first sub-cells may have different shapes. The third sensing cell may include a plurality of second sub-cells. At least two of the second sub-cells may have different shapes.

According to one or more exemplary embodiments, a number of the second sub-cells may be greater than a number of the first sub-cells.

According to one or more exemplary embodiments, the first sensing cell may be located in a first bending area of the display area, and the second sensing cell may be located in a planar area located in the first direction from the first bending area of the display area.

According to one or more exemplary embodiments, the display device may further include a third sensing line extending toward the non-display area from the first sensing cell. The third sensing line may be connected to the multiplexer.

According to one or more exemplary embodiments, the first sensing cell may be a variable resistor. The first sensing line may be connected to one end of the variable resistor, and the third sensing line may be connected to the other end of the variable resistor.

According to one or more exemplary embodiments, the display device may further include a fourth pad connected to the multiplexer through a third multiplexer line; and a pressure sensing unit connected to the first pad and the fourth pad.

According to one or more exemplary embodiments, when the first sensing cell operates as an antenna, the multiplexer may connect the first sensing line and the third sensing line to the second multiplexer line.

According to one or more exemplary embodiments, when the first sensing cell operates as a pressure sensor, the multiplexer may connect the first sensing line to the first multiplexer line, and connect the third sensing line to the third multiplexer line.

According to one or more exemplary embodiments, when the first sensing cell operates as a touch sensor, the multiplexer may connect the first sensing line and the third sensing line to the first multiplexer line.

According to one or more exemplary embodiments, the display device may further include a fifth pad connected to the multiplexer through a multiplexer control line; and a switching controller connected to the fifth pad.

According to one or more exemplary embodiments of the invention a method for driving a display device includes connecting a first sensing cell located in a bending area of a display area to a touch controller; connecting the first sensing cell to a wireless communication controller, when a touch input to the first sensing cell and other sensing cells corresponds to a first touch pattern; checking whether a touch input occurs in the first sensing cell, by connecting the first sensing cell to the touch controller; and maintaining the connection between the first sensing cell and the touch controller when the touch input occurs in the first sensing cell, and connecting the first sensing cell to the wireless communication controller when the touch input does not occur in the first sensing cell.

According to one or more exemplary embodiments of the invention a method for driving a display device includes connecting a first sensing cell located in a bending area of a display area to a pressure sensing unit; connecting the first sensing cell to a wireless communication controller, when a pressure input to the first sensing cell corresponds to a first pressure pattern; checking whether a touch input occurs in the first sensing cell, by connecting the first sensing cell to a touch controller, when a first period elapses; and maintaining the connection between the first sensing cell and the touch controller when the touch input occurs in the first sensing cell, and connecting the first sensing cell to the wireless communication controller when the touch input does not occur in the first sensing cell.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
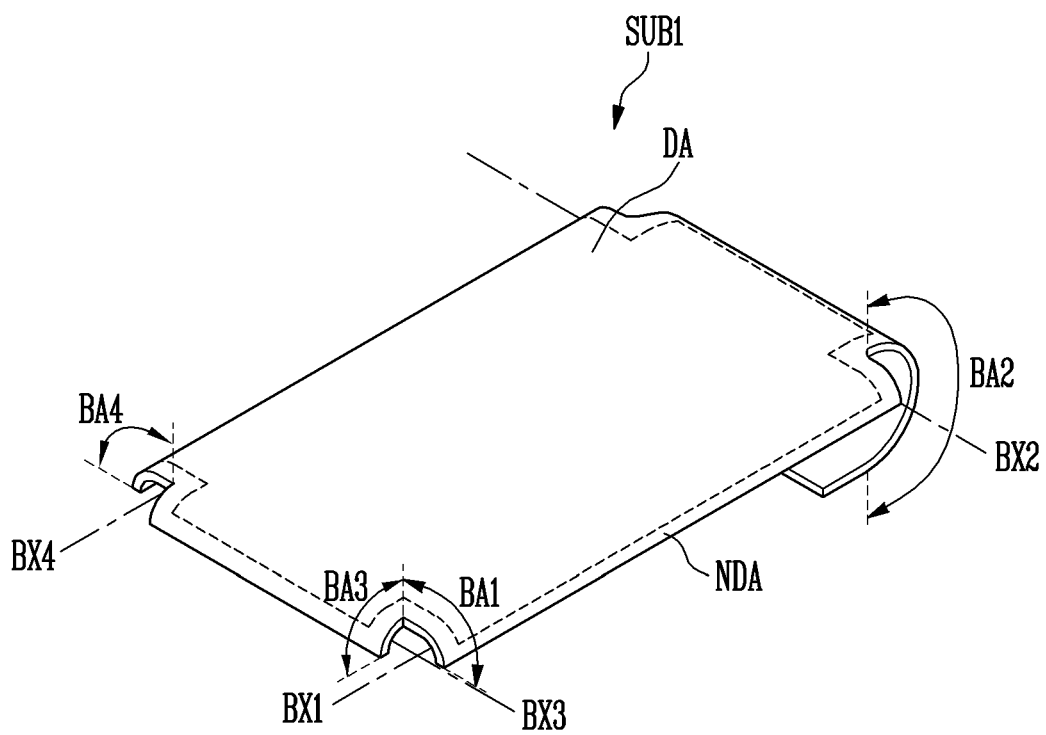
FIG. 1 is a diagram illustrating a substrate in accordance with an embodiment of the inventive concepts.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In the accompanying figures, the size and relative sizes of layers, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts. Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 2:
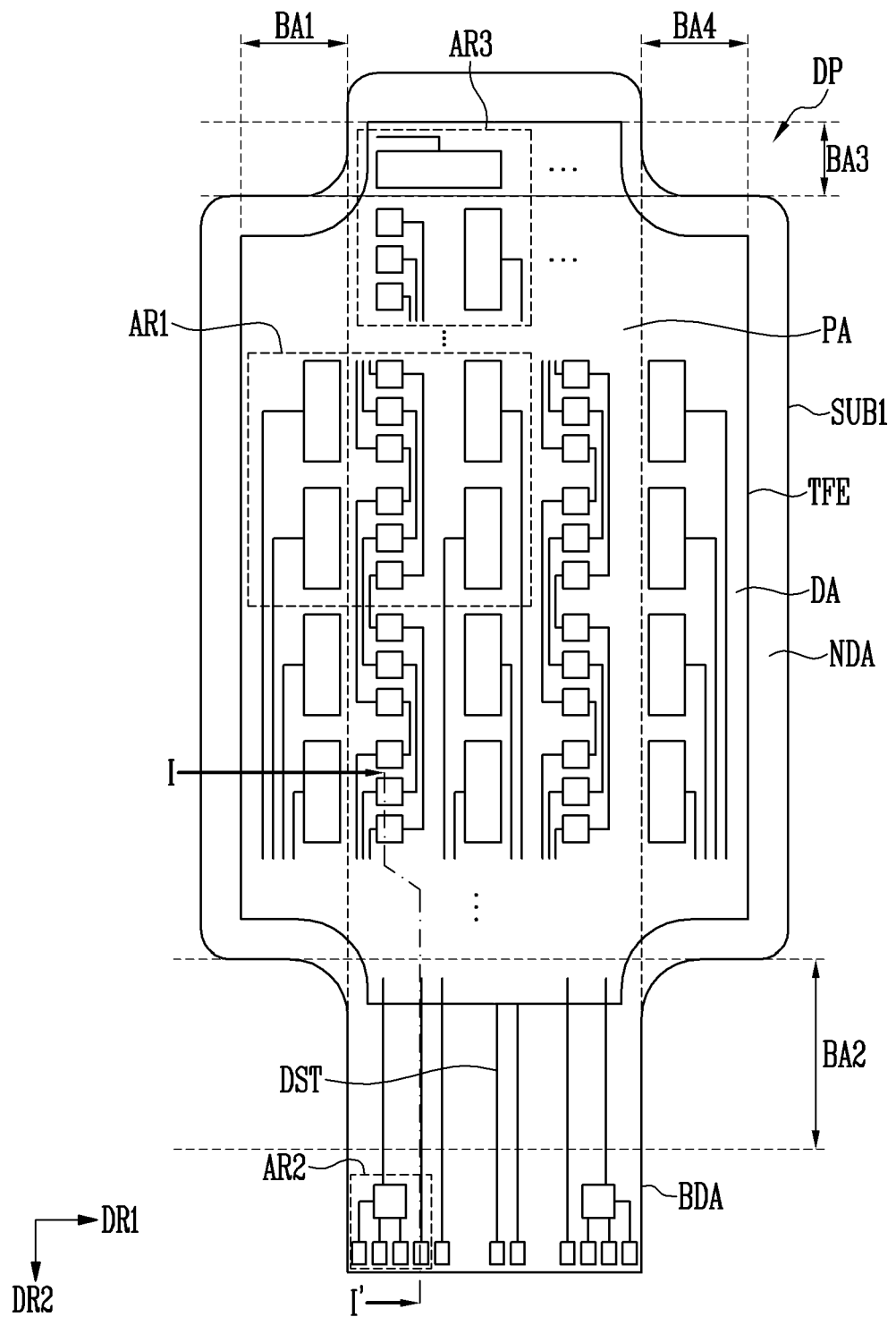
FIG. 2 is a diagram illustrating a display device in accordance with an embodiment of the inventive concepts.

FIG. 1 is a diagram illustrating a substrate in accordance with an embodiment of the present disclosure. FIG. 2 is a diagram illustrating a display device in accordance with an embodiment of the present disclosure.

Hereinafter, in embodiments, a position on a plane may be defined as a coordinate with respect to a first direction DR1 and a second direction DR2, and a height may be defined as a coordinate with respect to a third direction DR3 (see FIG. 3). The first direction DR1, the second direction DR2, and the third direction DR3 may be directions orthogonal to one another.

A first substrate SUB1 may include a display area DA and a non-display area NDA. The display area DA is an area in which pixels are disposed, and the non-display area NDA is an area in which the pixels are not disposed. According to the kind of a display device DP, each of the pixels may include a light emitting diode or include a liquid crystal layer. The non-display area NDA may surround the periphery of the display area DA.

Also, the first substrate SUB1 may include a planar area PA, bending areas BA1, BA2, BA3, and BA4, and a bonding area BDA. The display area DA may overlap with at least a portion of the planar area PA, a first bending area BA1, a second bending area BA2, a third bending area BA3, and a fourth bending area BA4. In addition, the non-display area NDA may overlap with the other portion of the planar area PA, the first bending area BA1, the second bending area BA2, the third bending area BA3, and the fourth bending area BA4. The non-display area NDA may include the bonding area BDA. Each corner of the areas may have an angled shape or a curved shape.

The planar shape PA in the display area DA may have an approximately rectangular shape. In the case of a circular display, the display area DA may have an approximately circular shape. In addition, the display area DA may be provided in a polygonal shape instead of a quadrangular shape, an elliptical shape, or the like. As described above, the shape of the display area DA may be changed depending on products.

The first bending area BA1 in the display area DA may be located in the opposite direction of the first direction DR1 from the planar area PA. For example, the first bending area BA1 may have a shape extending in the opposite direction of the first direction DR1 from the planar area PA. A first bending axis BX1 of the first bending area BA1 may extend in the second direction DR2. The first bending area BA1 may have an approximately rectangular shape. The second bending area BA2 in the display area DA may be located in the second direction DR2 from the planar area PA. For example, the second bending area BA2 may have a shape extending in the second direction DR2 from the planar area PA. A second bending axis BX2 of the second bending area BA2 may extend in the first direction DR1. The second bending area BA2 may have an approximately rectangular shape. The third bending area BA3 in the display area DA may be located in the opposite direction of the second direction DR2 from the planar area PA. The third bending area BA3 may have a shape extending in the opposite direction of the second direction DR2 from the planar area PA. A third bending axis BX3 of the third bending area BA3 may extend in the first direction DR1. The third bending area BA3 may have an approximately rectangular shape. The fourth bending area BA4 in the display area DA may be located in the first direction DR1 from the planar area PA. The fourth bending area BA4 may have a shape extending in the first direction DR1 from the planar area PA. A fourth bending axis BX4 of the fourth bending area BA4 may extend in the second direction DR2. The fourth bending area BA4 may have an approximately rectangular shape. In accordance with this embodiment, the display device DP may implement display areas with respect to four side surfaces, in addition to the planar area PA. In accordance with an embodiment, the first to fourth bending areas BA1, BA2, BA3, and BA4 may not overlap with each other.

The non-display area NDA may surround the periphery of the display area DA. The non-display area NDA is minimized, which is advantageous in a narrow bezel structure. Therefore, a shape of the non-display area may be similar to that of the display area DA.

However, the non-display area NDA may extend in the second direction DR2 with respect to the planar area PA. A portion of the non-display area NDA, which extends in the second direction DR2, may include the second bending area BA2 and the bonding area BDA. The bonding area BDA may be located in the second direction DR2 from the second bending area BA2.

An encapsulation layer TFE may be located over the pixels. For example, the encapsulation layer TFE may cover the pixels in the display area DA, and a boundary of the encapsulation layer TFE may be located in the non-display area NDA. The encapsulation layer TFE covers light emitting devices and circuit elements of the display area DA, so that damage from external moisture or impact can be prevented.

Sensing cells may be located on the encapsulation layer TFE. The sensing cells may sense a touch caused by a body of a user, hovering, a gesture, proximity, etc. The sensing cells may be configured in various types according to various types such as a resistive type, a capacitive type, an electro-magnetic (EM) type, and an optical type. For example, when the sensing cells are configured in the capacitive type, the sensing cells may be configured in a self-capacitive type, a mutual-capacitive type, or the like.

The sensing cells may be connected one-to-one or multiple-to-one to sensing lines. However, the term "connected" is merely a term for distinguishing a portion corresponding to the sensing cell from a portion corresponding to the sensing line. For example, the sensing cell and the sensing line may be integrally provided. That is, the sensing cell and the sensing line may be simultaneously formed by patterning one conductive layer. For example, the sensing line may extend from the sensing cell.

In another embodiment, the sensing cell may be formed by patterning a first conductive line, and the sensing line may be formed by patterning a second conductive line. The sensing cell and the sensing line may be connected to each other through a contact hole of an insulating layer between the first conductive layer and the second conductive layer.

Pads may be located on the bonding area BDA. Some of the pads may be connected to sensing cells located on the top of the encapsulation layer TFE through sensing lines. The sensing lines may extend in the second direction DR2 to traverse the second bending area BA2. In addition, some of the pads may be connected to pixels located on the bottom of the encapsulation layer TFE or a display driver of the pixels through display lines DST. The display driver may include at least one of a scan driver, an emission driver, and a data driver. The display driver may be located on the bottom of the encapsulation layer TFE and be located at the outside through the pads. The display line DST may include a control line, a data line, a power line, and the like, and provide signals such that the pixels can display an image. The signals may be provided from the display driver connected to the display lines DST.

FIG. 1 illustrates a state in which the first substrate SUB1 is bent, and FIG. 2 illustrates a state in which the first substrate SUB1 is not bent. In the display device DP, the first substrate SUB1 may be bent as shown in FIG. 1, after elements are stacked on the first substrate SUB1 in the state in which the first substrate SUB1 is not bent as shown in FIG. 2. According to this structure, it is advantageous to implement a thin bezel.

In another embodiment, the non-display area NDA may not include the second bending area BA2 and the bonding area BDA. For example, the sensing lines and the display lines DST may extend to a rear surface of the first substrate SUB1 through an opening of the first substrate SUB1. A surface on which the pixels are disposed may be defined as a front surface of the first substrate SUB1, and the opposite surface of the front surface may be defined as the rear surface of the first substrate SUB1. The pads may be located on the rear surface of the first substrate SUB1. According to this structure, a bending area of the display area DA, which is located in the second direction DR2 from the planar area PA, can be easily secured. That is, the display area can be easily implemented with respect to four side surfaces of the display device DP.

Figure 3:
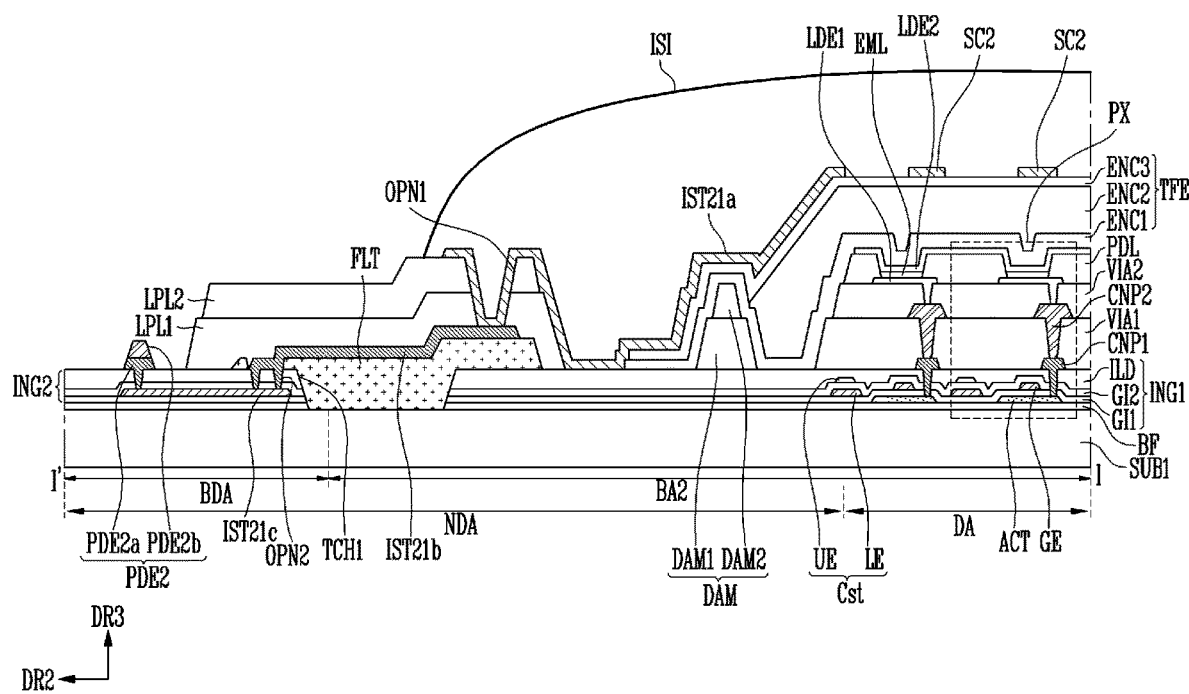
FIG. 3 is an embodiment of a section corresponding to line I-I' shown in FIG. 2.

FIG. 3 is an embodiment of a section corresponding to line I-I' shown in FIG. 2.

First, the display area DA will be described.

In an embodiment of the present disclosure, pixels PX are provided in the display area DA. Each pixel PX may include a transistor connected to a corresponding line among the display lines DST, a light emitting device connected to the transistor, and a capacitor Cst. For convenience of description, one transistor, one light emitting device, and one capacitor Cst with respect to one pixel PX are exemplarily illustrated in FIG. 3.

The first substrate SUB1 may be made of an insulative material such as glass or resin. Also, the first substrate SUB1 may be made of a material having flexibility to be bendable or foldable, and have a single- or multi-layered structure.

For example, the first substrate SUB1 may include at least one of polystyrene, polyvinyl alcohol, polymethyl methacrylate, polyethersulfone, polyacrylate, polyetherimide, polyethylene naphthalate, polyethylene terephthalate, poly-phenylene sulfide, polyarylate, polyimide, polycarbonate, triacetate cellulose, and cellulose acetate propionate. However, the material constituting the first substrate SUB1 may be variously changed, and the first substrate SUB1 may be made of a Fiber Reinforced Plastic (FRP), etc.

For example, when the first substrate SUB1 has a multi-layered structure, an inorganic material such as silicon nitride, silicon oxide, or silicon oxynitride may be interposed in a single layer or a multi-layer between a plurality of layers.

A buffer layer BF may cover the first substrate SUB1. The buffer layer BF may prevent an impurity from being diffused into a channel of the transistor. The buffer layer BF may be an inorganic insulating layer made of an inorganic material. For example, the buffer layer BF may be formed of silicon nitride, silicon oxide, silicon oxynitride, etc., and may be omitted according to the material and process conditions of the first substrate SUB1. In some embodiments, a barrier layer may be further provided.

An active layer ACT may be located on the buffer layer BF. The active layer ACT may be patterned to constitute the channel, a source electrode, and a drain electrode of the transistor or to constitute a line. The active layer ACT may be formed of a semiconductor material. The active layer ACT may be a semiconductor pattern made of poly-silicon, amorphous silicon, an oxide semiconductor, etc. The channel of the transistor is a semiconductor pattern, and may be an intrinsic semiconductor undoped with an impurity or be doped with the impurity. The source electrode, the drain electrode, and the line may correspond to a semiconductor pattern doped with the impurity. The impurity may include impurities such as an n-type impurity, a p-type impurity, and other metals.

A first gate insulating layer GI1 may cover the active layer ACT. The first gate insulating layer GI1 may be an inorganic insulating layer made of an inorganic material. The inorganic material may include inorganic insulating materials such as polysiloxane, silicon nitride, silicon oxide, and silicon oxynitride. In some embodiments, the first gate insulating layer GI1 may be configured as an organic insulating layer.

A gate electrode GE of the transistor and a lower electrode LE of the capacitor Cst may be located on the first gate insulating layer GI1. The gate electrode GE may overlap with an area corresponding to the channel of the transistor.

The gate electrode GE and the lower electrode LE may be made of a metal. For example, the gate electrode GE may be made of at least one of metals such as gold (Au), silver (Ag), aluminum (Al), molybdenum (Mo), chromium (Cr), titanium (Ti), nickel (Ni), neodymium (Nd), and copper (Cu), or any alloy thereof. Also, the gate electrode GE may be formed as a single layer. However, the present disclosure is not limited thereto, and the gate electrode GE may be formed as a multi-layer in which two or more material among metals and alloys are stacked.

A second gate insulating layer GI2 may cover the gate electrode GE and the lower electrode LE. The second gate insulating layer GI2 may be an inorganic insulating layer made of an inorganic material. The inorganic material may include polysiloxane, silicon nitride, silicon oxide, silicon oxynitride, etc. In some embodiments, the second gate insulating layer GI2 may be configured as an organic insulating layer.

An upper electrode UE of the capacitor Cst may be located on the second gate insulating layer GI2. The upper electrode of the capacitor Cst may be made of a metal. For example, the upper electrode UE may be made of at least one of metals such as gold (Au), silver (Ag), aluminum (Al), molybdenum (Mo), chromium (Cr), titanium (Ti), nickel (Ni), neodymium (Nd), and copper (Cu), or any alloy thereof. Also, the upper electrode UE may be formed as a single layer. However, the present disclosure is not limited thereto, and the upper electrode UE may be formed as a multi-layer in which two or more material among metals and alloys are stacked.

The lower electrode LE and the upper electrode UE may constitute the capacitor Cst with the second gate insulating layer GI2 interposed therebetween. In FIG. 3, a case where the capacitor Cst has a two-layer electrode structure of the lower electrode LE and the upper electrode UE has been illustrated. However, in another embodiment, the capacitor Cst may be configured in a three-layer electrode structure by using the active layer ACT, be configured in a three-layer electrode structure by using an electrode in the same layer as a first connection pattern CNP1, or be configured in a four or more-layer electrode structure.

An interlayer insulating layer ILD may cover the upper electrode UE of the capacitor Cst. The interlayer insulating layer ILD may be an inorganic insulating layer made of an inorganic material. The inorganic material may include polysiloxane, silicon nitride, silicon oxide, silicon oxynitride, etc. In some embodiments, the interlayer insulating layer ILD may be configured as an organic insulating layer.

In this embodiment, for convenience of description, the first gate insulating layer GI1, the second gate insulating layer GI2, and the interlayer insulating layer ILD may be designated as a first insulating layer group ING1. The first insulating layer group ING1 may cover a portion of the transistor. In some embodiments, the first insulating layer group ING1 may further include the buffer layer BF.

The first connection pattern CNP1 may be located on the interlayer insulating layer ILD. The first connection pattern CNP1 may be in contact with at least one of the source electrode and the drain electrode of the active layer ACT through a contact hole formed in the interlayer insulating layer ILD, the second gate insulating layer GI2, and the first gate insulating layer GI1. According to the transistor, the first connection pattern CNP1 may not in contact with the source electrode and the drain electrode of the active layer ACT.

The first connection pattern CNP1 may be made of a metal. For example, the first connection pattern CNP1 may be made of at least one of metals such as gold (Au), silver (Ag), aluminum (Al), molybdenum (Mo), chromium (Cr), titanium (Ti), nickel (Ni), neodymium (Nd), and copper (Cu), or any alloy thereof. Also, the first connection pattern CNP1 may be formed as a single layer. However, the present disclosure is not limited thereto, and the first connection pattern CNP1 may be formed as a multi-layer in which two or more material among metals and alloys are stacked.

Although not shown in the drawing, in some embodiments, a passivation layer may cover the first connection pattern CNP1. The passivation layer may be an inorganic insulating layer made of an inorganic material. The inorganic material may include polysiloxane, silicon nitride, silicon oxide, silicon oxynitride, etc.

A first via layer VIA1 may cover the passivation layer or the transistor. The first via layer VIA1 may be an organic insulating layer made of an organic material. The organic material may include an organic insulating material such as a polyacryl-based compound, a polyimide-based compound, a fluorine-based compound such as Teflon, or a benzocyclobutene-based compound.

A second connection pattern CNP2 may be connected to the first connection pattern CNP1 through an opening of the first via layer VIA1. The second connection pattern CNP2 may be made of at least one of metals such as gold (Au), silver (Ag), aluminum (Al), molybdenum (Mo), chromium (Cr), titanium (Ti), nickel (Ni), neodymium (Nd), and copper (Cu), or any alloy thereof. Also, the second connection pattern CNP2 may be formed as a single layer. However, the present disclosure is not limited thereto, and the second connection pattern CNP2 may be formed as a multi-layer in which two or more material among metals and alloys are stacked.

A second via layer VIA2 may cover the first via layer VIA1 and the second connection pattern CNP2. The second via layer VIA2 may be an organic insulating layer made of an organic material. The organic material may include an organic insulating material such as a polyacryl-based compound, a polyimide-based compound, a fluorine-based compound such as Teflon, or a benzocyclobutene-based compound.

A first light emitting device electrode LDE1 may be connected to the second connection pattern CNP2 through an opening of the second via layer VIA2. In some embodiments, the first light emitting device electrode LDE1 may be an anode of the light emitting device.

In some embodiments, the configuration of the second via layer VIA2 and the second connection pattern CNP2 may be omitted, and the first light emitting device electrode LDE1 may be directly connected to the first connection electrode CNP1 through an opening of the first via layer VIA1.

The first light emitting device electrode LDE1 may be made of a metal layer such as Ag, Mg, Al, Pt, Pd, Au, Ni, Nd, Ir, Cr, or any alloy thereof, and/or a transparent conductive layer such as indium tin oxide (ITO), indium zinc oxide (IZO), zinc oxide (ZnO), or indium tin zinc oxide (ITZO). The first light emitting device electrode LDE1 may be made of a kind of metal. However, the present disclosure is not limited thereto, and the first light emitting device electrode LDE1 may be made of an alloy of two or more kinds of metals, e.g., Ag and Mg. In addition, the first light emitting device electrode LDE1 may be formed as a single layer. However, the present disclosure is not limited thereto, and the first light emitting device electrode LDE1 may be formed as a multi-layer in which two or more material among metals and alloys are stacked.

When an image is to be provided in a lower direction of the first substrate SUB1, the first light emitting device electrode LDE1 may be formed as a transparent conductive layer. When an image is to be provided in an upper direction of the first substrate SUB1, the first light emitting device electrode LDE1 may be formed as a metal reflective layer and/or a transparent conductive layer.

A pixel defining layer PDL defining a light emitting area of each pixel PX is provided on the first substrate SUB1 on which the first light emitting device electrode LDE1 and the like are formed. The pixel defining layer PDL may be an organic insulating layer made of an organic material. The organic material may include an organic insulating material such as a polyacryl-based compound, a polyimide-based compound, a fluorine-based compound such as Teflon, or a benzocyclobutene-based compound.

The pixel defining layer PDL may expose a top surface of the first light emitting device electrode LDE1 and protrude from the first substrate SUB1 along the circumference of the pixel PX. A light emitting layer EML may be provided in an area of the pixel PX surrounded by the pixel defining layer PDL.

The light emitting layer EML may include a low molecular material or a high molecular material. The low molecular material may include copper phthalocyanine (CuPc), N,N'-Di(naphthalene-1-yl)-N,N'-diphenyl-benzidine (NPB), tris-8-hydroxyquinoline aluminum (Alq3), etc. The high molecular material may include PEDOT, a poly-phenylenevinylene-based (PPV)-based material, a polyfluorene-based material, etc. These materials may be formed through vacuum deposition. Also, these materials may be formed through screen printing or inkjet printing, laser induced thermal imaging (LITI), etc.

The light emitting layer EML may be provided as a single layer, but may be provided as a multi-layer including various functional layers. When the light emitting layer EML is provided as the multi-layer, the light emitting layer EML may have a structure in which a hole injection layer (HIL), a hole transport layer (HTL), an emission layer (EML), an electron transport layer (ETL), an electron injection layer (EIL), and the like are stacked in a single- or multi-layered structure.

In some embodiments, at least a portion of the light emitting layer EML may be integrally formed throughout a plurality of first light emitting device electrodes LDE1, and be individually provided to correspond to each of the plurality of first light emitting device electrodes LDE1.

A second light emitting device electrode LDE2 may be provided on the light emitting layer EML. The second light emitting device electrode LDE2 may be provided for each pixel PX, but provided to cover most of the display area DA. The second light emitting device electrode LDE2 may be shared by a plurality of pixels PX.

In some embodiments, the second light emitting device electrode LDE2 may be used as a cathode or an anode. When the first light emitting device electrode LDE1 is the anode, the second light emitting device electrode LDE2 may be used as the cathode. When the first light emitting device electrode LDE1 is the cathode, the second light emitting device electrode LDE2 may be used as the anode.

The second light emitting device electrode LDE2 may be made of a metal layer such as Ag, Mg, Al, Pt, Pd, Au, Ni, Nd, Ir, Cr, or any alloy thereof, and/or a transparent conductive layer such as indium tin oxide (ITO), indium zinc oxide (IZO), zinc oxide (ZnO), or indium tin zinc oxide (ITZO). In an embodiment of the present disclosure, the second light emitting device electrode LDE2 may be made of a kind of metal. However, the present disclosure is not limited thereto, and the second light emitting device electrode LDE2 may be made of an alloy of two or more kinds of metals, e.g., Ag and Mg. In addition, the second light emitting device electrode LDE2 may be formed as a single layer. However, the present disclosure is not limited thereto, and the second light emitting device electrode LDE2 may be formed as a multi-layer in which two or more material among metals and alloys are stacked.

When an image is to be provided in a lower direction of the first substrate SUB1, the second light emitting device electrode LDE2 may be formed as a metal reflective layer and/or a transparent conductive layer. When an image is to be provided in an upper direction of the first substrate SUB1, the first light emitting device electrode LDE1 may be formed as a transparent conductive layer.

A set of the first light emitting device electrode LDE1, the light emitting layer EML, and the second light emitting device electrode LDE2, which are described above, may be designated as the light emitting device.

The encapsulation layer TFE may be provided over the second light emitting device electrode LDE2. The encapsulation layer TFE may be provided as a single layer but be provided as a multi-layer. In this embodiment, the encapsulation layer TFE may be provided with first to third encapsulation layers ENC1, ENC2, ENC3. The first to third encapsulation layers ENC1, ENC2, and ENC3 may be made of an organic material and/or an inorganic material. The third encapsulation layer ENC3 located at the outermost portion of the encapsulation layer TFE may be made of an inorganic material. For example, the first encapsulation layer ENC1 may be an inorganic layer made of an inorganic material, the second encapsulation layer ENC2 may be an organic layer made of an organic material, and the third encapsulation layer ENC3 may be an inorganic layer made of an inorganic material. As compared with the organic material, moisture or oxygen less penetrates the inorganic material, but the inorganic material is weak to cracks due to its small flexibility. The first encapsulation layer ENC1 and the third encapsulation layer ENC3 are formed of an inorganic material, and the second encapsulation layer ENC2 is formed of an organic material, so that the propagation of cracks can be prevented. The layer made of the organic material, i.e., the second encapsulation layer ENC2 may be completely covered by the third encapsulation layer ENC3 such that an end portion of the second encapsulation layer ENC2 is not exposed to the outside. The organic material may include organic insulating materials such as a polyacryl-based compound, a polyimide-based compound, a fluorine-based compound such as Teflon, and a benzocyclobutene-based compound. The inorganic material may include inorganic insulating materials such as polysiloxane, silicon nitride, silicon oxide, and silicon oxynitride.

The light emitting layer EML constituting the light emitting device may be easily damaged by moisture, oxygen or the like from the outside. The encapsulation layer TFE covers the light emitting layer EML, to protect the light emitting layer EML. The encapsulation layer TFE may cover the display area DA, and extend up to the non-display area NDA as the outside of the display area DA. In the case of insulating layers made of an organic material, the insulating layers are advantageous in terms of flexibility, elasticity, and the like, but moisture or oxygen easily penetrates the insulating layers, as compared with insulating layers made of an inorganic material. In an embodiment of the present disclosure, in order to prevent penetration of moisture or oxygen through the insulating layers made of the organic material, end portions of the insulating layers made of the organic material may be covered by the insulating layers made of the inorganic material. For example, the first via layer VIA1, the second via layer VIA2, and the pixel defining layer PDL, which are made of an organic material, do not continuously extend, and may be covered by the first encapsulation layer ENC1. Accordingly, a top surface of the pixel defining layer PDL and side surfaces of the first via layer VIA1, the second via layer VIA2, and the pixel defining layer PDL are encapsulated by the encapsulation layer TFE including an inorganic material, so that exposure to the outside can be prevented.

However, whether the encapsulation layer TFE is provided as a multi-layer or the material of the encapsulation layer TFE is not limited thereto and may be variously changed. For example, the encapsulation layer TFE may include a plurality of organic material layers and a plurality of inorganic material layers, which are alternately stacked.

Sensing cells SC2 and a first line pattern IST21a of a sensing line may be located on the encapsulation layer TFE. The sensing cells SC2 and the first line pattern IST21a may be integrally formed by patterning one conductive layer. Therefore, the sensing cells SC2 and the first line pattern IST21a may include the same material. In some embodiments, an insulating layer may be added between the sensing cells SC2 and the encapsulation layer TFE. The sensing cells SC2 may overlap with a plurality of pixels PX in the third direction DR3. An area of one sensing cell SC2 on a plane may be greater than that of one pixel PX on a plane.

Figure 14:
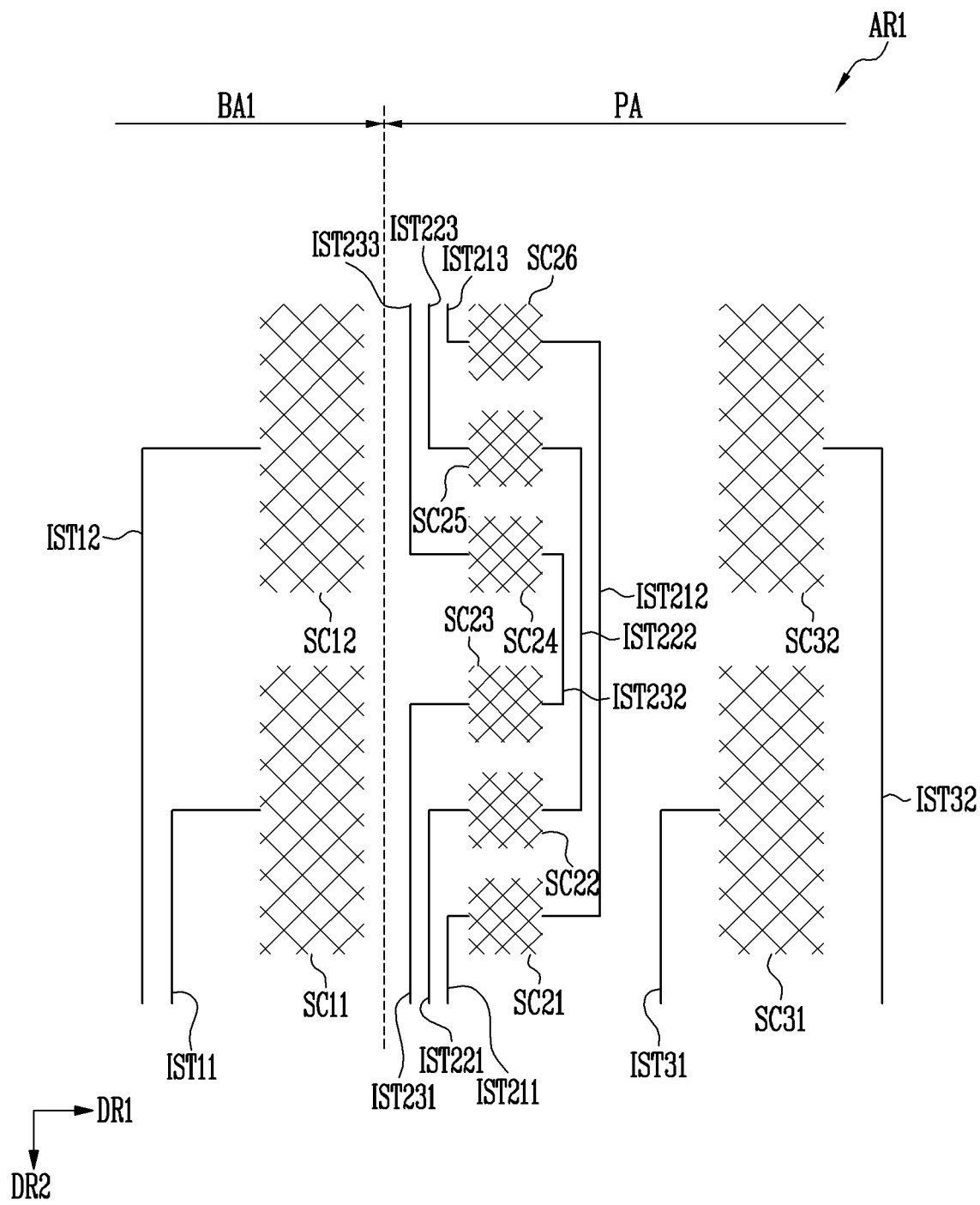

The sensing cells SC2 and the first line pattern IST21a may be made of at least one of metal materials such as Ag, Mg, Al, Pt, Pd, Au, Ni, Nd, Ir, and Cr. When the sensing cells SC2 and the first line pattern IST21a are made of an opaque conductive material, the sensing cells SC2 and the first line pattern IST21a may be configured in the shape of a mesh as shown in FIG. 14. The pixels PX may not overlap with a conductive line of the mesh in the third direction DR3. The pixels PX may overlap with openings of a corresponding mesh in the third direction DR3.

The sensing cells SC2 and the first line pattern IST21a may be made of a transparent conductive layer such as indium tin oxide (ITO), indium zinc oxide (IZO), zinc oxide (ZnO), or indium tin zinc oxide (ITZO). When the sensing cells SC2 and the first line pattern IST21a are made of the transparent conductive material, the sensing cells SC2 and the first line pattern IST21a may overlap with the pixels PX in the third direction DR3 (see FIG. 3).

An over-coating layer ISI may be located over the sensing cells SC2 and the first line pattern IST21a. The over-coating layer ISI may be configured as an organic layer. For example, the organic material may include an organic insulating material such as a polyacryl-based compound, a polyimide-based compound, a fluorine-based compound such as Teflon, or a benzocyclobutene-based compound. For example, the over-coating layer ISI may include polymethyl methacrylate, polydimethylsiloxane, polyimide, acrylate, polyethylene terephthalate, polyethylene naphthalate, etc.

Next, the non-display area NDA will be described. Hereinafter, in description of the non-display area NDA, descriptions of portions which have already been described will be omitted or simplified.

A dam DAM may be located at a boundary of the second encapsulation layer ENC2. The dam DAM may have a double-layered structure. For example, the dam DAM may include a first dam DAM1 and a second dame DAM2. For example, the first and second dams DAM1 and DAM2 may be made of an organic material. Each of the first and second dams DAM1 and DAM2 may correspond to any one of the first via layer VIA1, the second via layer VIA2, and the pixel defining layer PDL. For example, when the first dam DAM1 is formed of the same material through the same process as the first via layer VIA1, the second dam DAM2 may be formed of the same material through the same process as the second via layer VIA2 or the pixel defining layer PDL. In another example, when the first dam DAM1 is formed of the same material through the same process as the second via layer VIA2, the second dam DAM2 may be formed of the same material through the same process as the pixel defining layer PDL. In addition, when a spacer is formed on the pixel defining layer of the display area DA, the dam DAM may be formed by using the same material as the spacer.

The dam DAM prevents the organic material of the second encapsulation layer having strong liquidity from overflowing to the outside of the dam DAM. The first and third encapsulation layers ENC1 and ENC3, which are made of the inorganic material, extends while covering the data DAM, so that adhesion of the first and third encapsulation layers ENC1 and ENC3 with the first substrate SUB1 or other layers on the top of the substrate SUB1.

A pad PDE2 is located on the first substrate SUB and may be spaced apart from a planarization layer FLT. The pad PDE2 may be supported by a second insulating layer group ING2. Insulating layers of the second insulating layer group ING2 may respectively correspond to those of the first insulating layer group ING1. The pad PDE2 may include a first pad electrode PDE2a and a second pad electrode PDE2b. For example, the first pad electrode PDE2a may be made of the same material as the first connection pattern CNP1. For example, the second pad electrode PDE2b may be made of the same material as the second connection pattern CNP2.

The planarization layer FLT is located on the first substrate SUB1, and may be spaced apart from an area covered by the encapsulation layer TFE. The planarization layer FLT may be an organic insulating layer made of an organic material. The organic material may include an organic insulating material such as a polyacryl-based compound, a polyimide-based compound, a fluorine-based compound such as Teflon, or a benzocyclobutene-based compound.

In this embodiment, the planarization layer FLT may be formed before the first connection pattern CNP1 is formed after the interlayer insulating layer ILD is formed. Therefore, the planarization layer FLT and the first via layer VIA1 may be formed through different processes. In some embodiments, the planarization layer FLT and the first via layer VIA1 may include different organic materials. In still another embodiment, the planarization layer FLT and the first via layer VIA1 may be formed of the same material through the same process.

One end of the planarization layer FLT may cover the first insulating layer group ING1. In addition, a portion of the planarization layer FLT may fill a first trench TCH1 between the first insulating layer group ING1 and the second insulating layer group ING2.

Since inorganic insulating layers have high hardness and small flexibility, as compared with organic insulating layers, the probability that cracks will occur in the inorganic insulating layers is relatively high. When cracks occur in the inorganic insulating layers, the cracks may propagate to lines on the inorganic insulating layers. As a result, a failure such as line disconnection may occur.

Accordingly, as shown in FIG. 3, the inorganic insulating layers are removed at a portion of the second bending area BA2, so that the first trench TCH1 can be formed, and the first insulating layer group ING1 and the second insulating layer group ING2 can be distinguished from each other. In this embodiment, a case where all inorganic insulating layers corresponding to the area of the first trench TCH1 are removed has been illustrated. However, in another embodiment, some inorganic insulating layers may remain. Some remaining inorganic insulating layers may include a slit, so that bending stress can be dispersed.

A second line pattern IST21b of the sensing line may extend on the planarization layer FLT, and be electrically connected to the pad PDE2. In this embodiment, the second line pattern IST21b may be formed of the same material through the same process as the first connection pattern CNP1. In still another embodiment, the second line pattern IST21b may be formed of the same material through the same process as the second connection pattern CNP2.

A first line protective layer LPL1 may cover the planarization layer FLT and the second line pattern IST21b. In addition, a second line protective layer LPL2 may cover the first line protective layer LPL1. In some embodiments, the configuration of the second line protective layer LPL2 may be omitted. The first and second line protective layers LPL1 and LPL2 may be made of an organic material. Each of the first and second line protective layers LPL1 and LPL2 may correspond to any one of the first via layer VIA1, the second via layer VIA2, and the pixel defining layer PDL. For example, when the first line protective layer LPL1 is formed of the same material through the same process as the first via layer VIA1, the second line protective layer LPL2 may be formed of the same material through the same process as the second via layer VIA2 or the pixel defining layer PDL. In another example, when the first line protective layer LPL1 is formed of the same material through the same process as the second via layer VIA2, the second line protective layer LPL2 may be formed of the same material through the same process as the pixel defining layer PDL.

The first and second line protective layers LPL1 and LPL2 may include a first opening OPN1 exposing the second line pattern IST21b.

The first line pattern IST21a may be connected to the second line pattern IST21b through the first opening OPN1. In accordance with this embodiment, a height of the second line pattern IST21b located on one end of the first insulating layer group ING1 and the planarization layer FLT may be greater than that of the second line pattern IST21b located on the planarization layer FLT corresponding to the first trench TCH1.

Therefore, the first line pattern IST21a and the second line pattern IST21b may be directly connected to each other without another bridge pattern. Since the bridge pattern does not exist, connection reliability between the first line pattern IST21a and the second line pattern IST21b is improved. Further, the length of the non-display area NDA can be decreased by the length of the bridge pattern. Thus, a dead space can be decreased, and a thin bezel can be easily implemented.

A third line pattern IST21c of the sensing line may connect the pad PDE2 and the second line pattern IST21b. The third line pattern IST21c may be formed of the same material through the same process as the gate electrode GE of the transistor. In some embodiments, the third line pattern IST21c may be formed of the same material through the same process as the upper electrode UE. In some embodiments, an odd-numbered third line pattern IST21c may be formed of the same material through the same process as the gate electrode GE of the transistor, and an even-numbered third line pattern IST21c may be formed of the same material through the same process as the upper electrode UE. On the contrary, the even-numbered third line pattern IST21c may be formed of the same material through the same process as the gate electrode GE of the transistor, and the odd-numbered third line pattern IST21c may be formed of the same material through the same process as the upper electrode UE. Accordingly, the problem of a short circuit between adjacent lines can be more efficiently prevented.

The second insulating layer group ING2 may include a second opening OPN2 exposing the third line pattern IST21c. In addition, the planarization layer FLT may include an opening corresponding to the second opening OP2. The second line pattern IST21b may be connected to the third line pattern IST21c though the second opening OP2.

Figure 4:
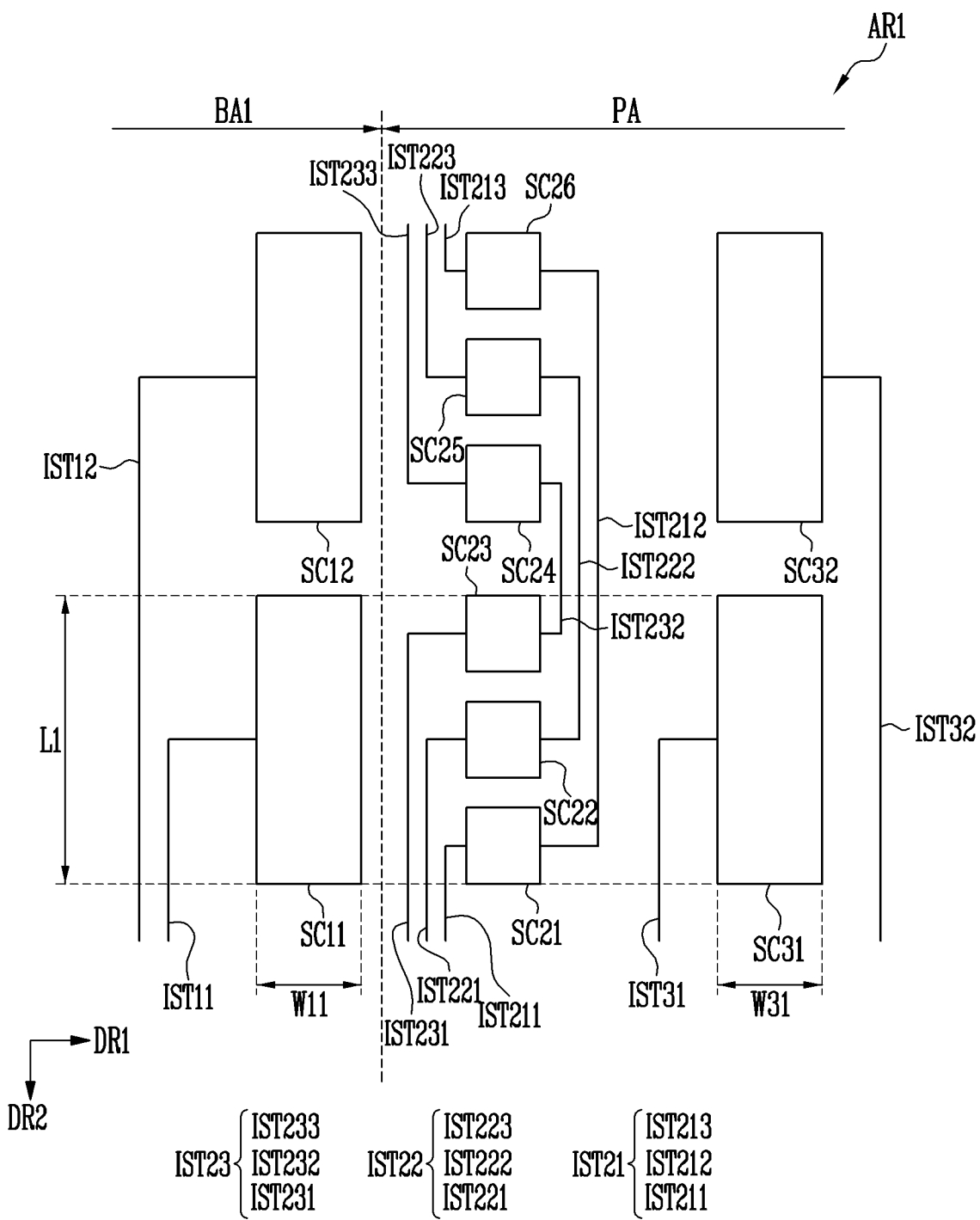
FIG. 4 is a diagram illustrating a first area in accordance with an embodiment of the inventive concepts.

FIG. 4 is a diagram illustrating a first area in accordance with an embodiment of the present disclosure.

Referring to FIG. 4, the first area AR1 may correspond to a portion of the first bending area BA1 and a portion of the planar area PA.

First sensing cells SC11 and SC12 may be located in the bending area BA1 of the display area DA. A first sensing line IST11 may extend toward the non-display area NDA (e.g., the bonding area BDA) from the first sensing cell SC11. A first sensing line IST12 may extend toward the non-display area NDA (e.g., the bonding area BDA) from the first sensing cell SC12. The first sensing lines IST11 and IST12 may mainly extend in the second direction DR2.

The first sensing cell SC11 may be a sensing cell most adjacent to the first sensing cell SC12 in the second direction DR2. In this embodiment, shapes of the first sensing cells SC11 and SC12 may be substantially identical to each other. For example, a length W11 of the first sensing cells SC11 and SC12 in the first direction DR1 and a length L1 of the first sensing cells SC11 and SC12 in the second direction DR2 may be equal to each other. The first sensing cells SC11 and SC12 may be arranged in the second direction DR2.

As each of the first sensing cells SC11 and SC12 may become more distant from a corresponding pad, the length of a corresponding one of the first sensing lines IST11 and IST12 becomes longer. Therefore, the first sensing line IST12 may be longer than the first sensing line IST11. In order to compensate for an IR drop, the first sensing line IST12 may be thicker than the first sensing line IST11.

Second sensing cells SC21, SC22, SC23, SC24, SC25, and SC26 may be located in the planar area PA of the display area DA. The second sensing cells SC21 to SC26 may be sensing cells most adjacent to a boundary of the planar area PA (e.g., a boundary between the first bending area BA1 and the planar area PA) in the opposite direction of the first direction DR1.

The second sensing cells CS21, CS22, and CS23 are sensing cells most adjacent to the first sensing cell SC11 in the first direction DR1. In addition, the second sensing cells CS24, CS25, and CS26 are sensing cells most adjacent to the first sensing cell SC12 in the first direction DR1.

Shapes of the second sensing cells SC21 to SC26 may be substantially identical to one another. For example, a length of the second sensing cells SC21 to SC26 in the first direction DR1 and a length of the second sensing cells SC21 to SC26 in the second direction DR2 may be equal to each other. The second sensing cells SC21 to SC26 may be arranged in the second direction DR2. The second sensing cells SC21 to SC26 may be considered as one column.

Sensing cells symmetrical with each other in the second direction DR2 among the second sensing cells SC21, SC22, and SC23 and the second sensing cells SC24, SC25, and SC26 may be connected to each other. The second sensing cells SC23 and SC24 may be connected to each other through a second sensing line IST232. The second sensing cells SC22 and SC25 may be connected to each other through a second sensing line IST222. The second sensing cells SC21 and SC26 may be connected to each other through a second sensing line IST212. Through this structure, the second sensing lines and the second sensing cells may be integrally formed at the same time by one conductive layer.

For example, since second sensing lines IST211, IST212, and IST213 are integrally formed, the second sensing lines IST211, IST212, and IST213 may be designated as one second sensing line IST21. In addition, since two or more consecutive sensing lines among the second sensing lines IST211, IST212, and IST213 are integrally formed, the two or more consecutive sensing lines may be designated as one second sensing line. For example, the second sensing line IST212 and IST211 may extend toward the non-display area NDA (e.g., the bonding area BDA) from the second sensing cell SC26. For example, the second sensing line IST211 may extend toward the non-display area NDA (e.g., the bonding area BDA) from the second sensing cell SC21. In addition, at least one second sensing line may extend toward the non-display area NDA from a second sensing cell (not shown) most adjacent to a boundary of the planar area PA in the second direction DR2. Second sensing lines IST22 and IST23 can also be similarly described.

Third sensing cells (SC31 and SC32) may be located in the planar area PA of the display area DA. A third sensing line IST31 may extend toward the non-display area NDA (e.g., the bonding area BDA) from the third sensing cell SC31. A third sensing line IST32 may extend toward the non-display area NDA (e.g., the bonding area BDA) from the third sensing cell SC32. The third sensing lines IST31 and IST32 may mainly extend in the second direction DR2.

The third sensing cell SC31 may be a sensing cell most adjacent to the second sensing cells SC21, SC22, and SC23 in the first direction DR1. The third sensing cell SC32 may be a sensing cell most adjacent to the second sensing cells SC24, SC25, and SC26 in the first direction DR1.

The third sensing cell SC31 may be a sensing cell most adjacent to the third sensing cell SC32 in the second direction DR2. In this embodiment, shapes of the third sensing cells SC31 and SC32 may be substantially identical to each other. For example, a length W31 of the third sensing cells SC31 and SC32 in the first direction DR1 and a length L1 of the third sensing cells SC31 and SC32 in the second direction DR2 may be equal to each other. The third sensing cells SC31 and SC32 may be arranged in the second direction DR2. The third sensing cells SC31 and SC32 may be considered as one column.

For example, the length W11 of the first sensing cell SC11 in the first direction DR1 may correspond to (e.g., be equal to) that W31 of the third sensing cell SC31 in the first direction DR1. For example, the length L1 of the first sensing cell SC11 in the second direction DR2 may correspond to (e.g., be equal to) that L1 of the third sensing cell SC31 in the second direction DR2. For example, the length of each of the second sensing cells SC21, SC22, and SC23 in the second direction DR2 may be shorter than that L1 of the first sensing cell SC11 in the second direction DR2.

In the planar area PA, the column of the second sensing cells SC21 to SC26 and the column of the third sensing cell SC31 and SC32 may be alternately disposed in the first direction DR1. Referring to FIG. 2, sensing cells most adjacent to a boundary of the planar area PA in the first direction DR1 (i.e., a boundary between the planar area PA and the fourth bending area BA4) may be second sensing cells. According to this structure, the first sensing cells and the third sensing cells serve as receiving electrodes (i.e., Rx electrodes), and the second sensing cells serve as driving electrodes (i.e., Tx electrodes), so that touch position sensing using a mutual-capacitive method is possible. In some embodiments, the first sensing cells and the third sensing cells serve as driving electrodes, and the second sensing cells serve as receiving electrodes, so that touch position sensing using the mutual-capacitive method is possible.

Figure 5:
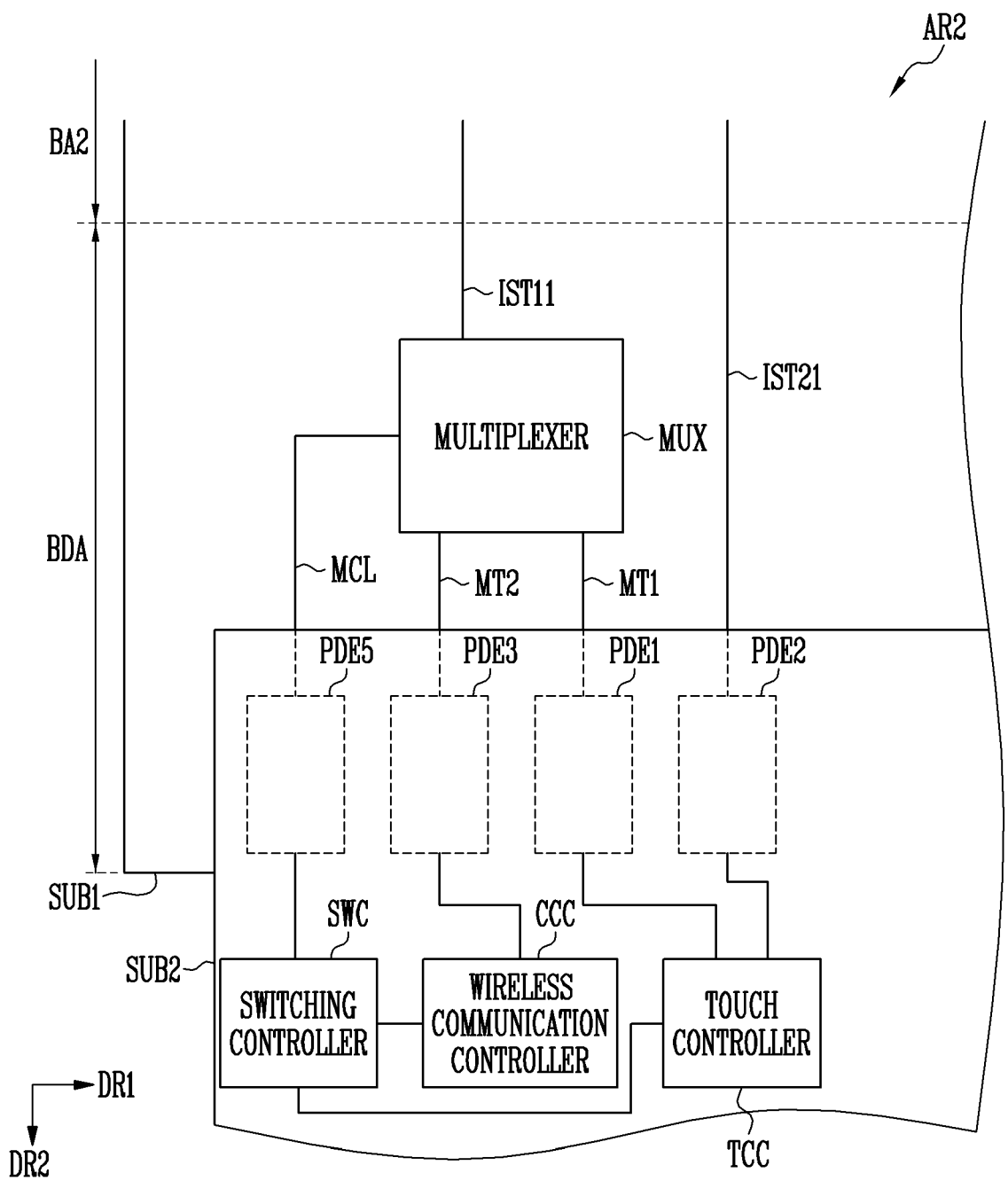
FIG. 5 is a diagram illustrating a second area in accordance with an embodiment of the inventive concepts.

FIG. 5 is a diagram illustrating a second area in accordance with an embodiment of the present disclosure.

Referring to FIG. 5, the second area AR2 may correspond to a portion of the bonding area BDA. Also, the second area AR2 may correspond to a portion of the bonding area BDA and a portion of the second bending area BA2.

In FIG. 5, for convenience of description, an operation of a multiplexer MUX will be described with respect to the first sensing cell SC11 and the second sensing cell SC21. Although not shown in the drawing, all first sensing cells of the first bending area BA1 may be connected to the multiplexer MUX through corresponding first sensing lines. In addition, all second sensing cells of the planar area PA may be connected to corresponding pads through corresponding second sensing lines. That is, the second sensing lines may not be connected to the multiplexer MUX. In addition, all third sensing cells of the planar area PA may be connected to corresponding pads through corresponding third sensing lines. That is, the third sensing lines may not be connected to the multiplexer MUX.

The multiplexer MUX may be located in the non-display area NDA (particularly, the bonding area BDA. The multiplexer MUX may be connected to the first sensing line IST11 and may not be connected to the second sensing line IST21. Also, the multiplexer MUX may not be connected to the third sensing line IST31. A first pad PDE1 may be connected to the multiplexer MUX through a first multiplexer line MT1. A second pad PDE2 may be connected to the second sensing line IST21. A third pad PDE3 may be connected to the multiplexer MUX through a second multiplexer line MT2. A fifth pad PDE5 may be connected to the multiplexer MUX through a multiplexer control line MCL.

A second substrate SUB2 may be a flexible printed circuit board (FPCB). A switching controller SWC, a wireless communication controller CCC, and a touch controller TCC may be mounted on the second substrate SUB2. Pads of the second substrate SUB2 and the pads PDE1, PDE2, PDE3, and PDE5 are bonded to each other, so that the switching controller SWC, the wireless communication controller CCC, and the touch controller TCC can be connected to the multiplexer MUX.

The wireless communication controller CCC may be connected to the third pad PDE3. The touch controller TCC may be connected to the first pad PDE1 and the second pad PDE2. The switching controller SWC may be connected to the fifth pad PDE5.

The switching controller SWC may apply a multiplexer control signal to the multiplexer control line MCL, based on an operation of the wireless communication controller CCC and the touch controller TCC. The multiplexer MUX may connect the first sensing line IST11 to one of the first multiplexer line MT1 and the second multiplexer line MT2 according to the multiplexer control signal. When the first multiplexer line MT1 is connected to the first sensing line IST11, the first sensing cell SC11 may serve as a touch sensor. Meanwhile, when the second multiplexer liner MT2 is connected to the first sensing line IST11, the first sensing cell SC11 may serve as an antenna.

The touch controller TCC may be connected to the second sensing line IST21 through the second pad PDE2. The touch controller TCC may be connected to the third sensing line IST31 through a pad (not shown).

The touch controller TCC transmits a driving signal to the second sensing line IST21 and receives a sensing signal from the third sensing line IST31, so that a touch position can be detected by using the mutual-capacitive method. When the first multiplexer line MT1 is connected to the first sensing line IST11, the touch controller TCC further receives a sensing signal from the first sensing line IST11, so that a touch position in the first bending area BA1 can be detected.

Similarly, the touch controller TCC transmits a driving signal to the third sensing line and receives a sensing signal from the second sensing line, so that a touch position can be detected by using the mutual-capacitive method. When the first multiplexer line MT1 is connected to the first sensing line IST11, the touch controller TCC further transmits a driving signal to the first sensing line IST11, so that a touch position in the first bending area BA1 can be detected.

When the second multiplexer line MT2 is connected to the first sensing line IST11, the wireless communication controller CCC may transmit/receive a wireless signal through the first sensing cell SC11 as the antenna.

The above-described operation of the multiplexer MUX may be independently performed on each of the first sensing cells of the first bending area BA1. Therefore, some first sensing cells may serve as touch sensors, and the other first sensing cells may serve as antennae. According to this structure, the function of the first sensing cells is changed depending on a grasping method of a user, so that the detection of a touch position and the transmission/reception of a wireless signal can be efficiently performed. For example, first sensing cell covered by a hand of the user may operate as touch sensors, and first sensing cells which are not covered by the hand of the user may operate as antennae.

Although this embodiment has been described based on the first bending area BA1, the same function may be implemented by using the third and fourth bending areas BA3 and BA4.

Figure 6:
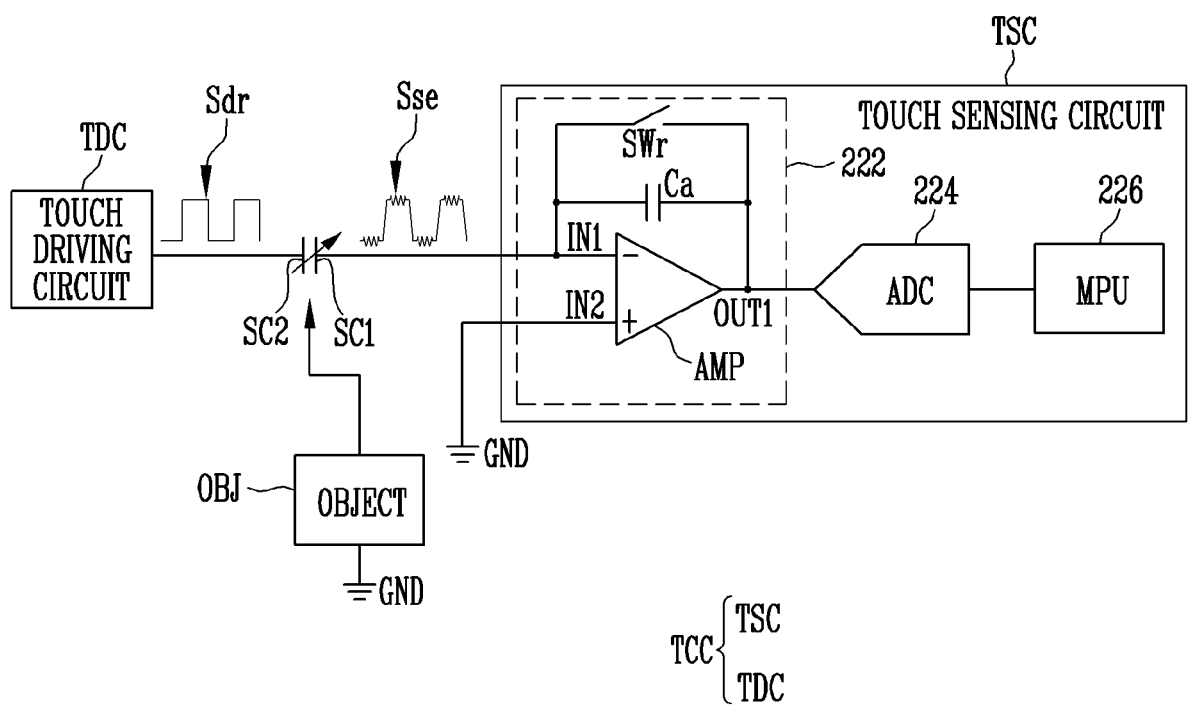
FIGS. 6 and 7 are diagrams illustrating a touch controller in accordance with an embodiment of the inventive concepts.
Figure 7:
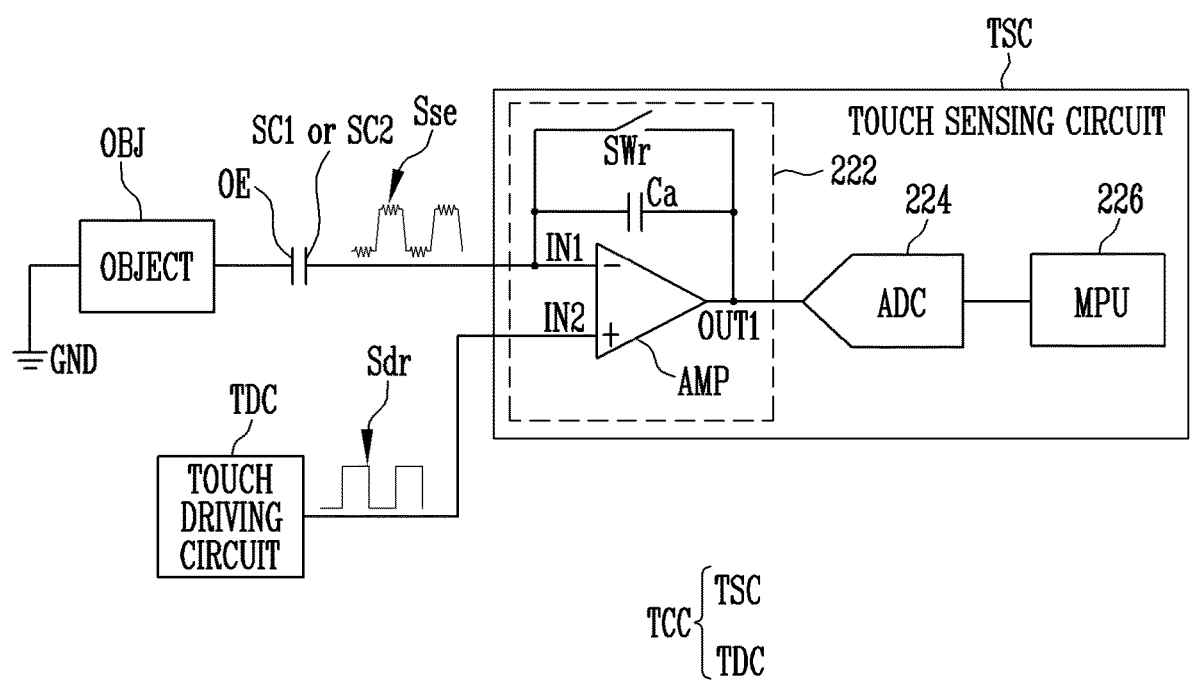

FIGS. 6 and 7 are diagrams illustrating a touch controller in accordance with an embodiment of the present disclosure.

In FIG. 6, in a mutual-capacitive mode, an exemplary relationship between the touch controller TCC and sensing cells SC1 and SC2 is illustrated. The touch controller TCC may include a touch driving circuit TDC and a touch sensing circuit TSC.

A first sensing cell SC1 may be connected to the touch sensing circuit TSC, and a second sensing cell SC2 may be connected to the touch driving circuit TDC.

The touch sensing circuit TSC may include an operational amplifier AMP, and the first sensing cell SC1 may be connected to a first input terminal IN1 of the operational amplifier AMP. A second input terminal IN2 of the operational amplifier AMP may be connected to a reference voltage source GND.

A driving signal Sdr is supplied to the second sensing cell SC2 from the touch driving circuit TDC during a touch sensing period in which a touch sensing mode is activated. In some embodiments, the driving signal Sdr may be an AC signal having a predetermined period, such as a pulse wave.

The touch sensing circuit TSC may sense the first sensing cell SC1 by using a sensing signal Sse generated by the driving signal Sdr. The sensing signal Sse may be generated based on a mutual capacitance formed by the first sensing cell SC1 and the second sensing cell SC2. The mutual capacitance formed by the first sensing cell SC1 and the second sensing cell SC2 may be changed depending on a degree to which an object OBJ such as a finger of a user approaches the second sensing cell SC2, and accordingly, the sensing signal Sse may be changed. Whether the object OBJ has touched may be detected by using a difference in the sensing signal Sse.

Meanwhile, in some embodiments, each first sensing cell SC1 along with an operational amplifier AMP connected to the second sensing cell SC2 (or an analog front end (AFE) having the operational amplifier AMP) may constitute a sensing channel 222. However, for convenience of description, the first sensing cells and sensing channels 222 constituting a signal receiver of the touch sensing circuit TSC, which are distinguished from each other, will be described hereinbelow.

The touch sensing circuit TSC amplifies, converts, and processes sensing signals Sse input from the respective first sensing cells SC1, and detects a touch input, based on a result thereof. To this end, the touch sensing circuit TSC may include a sensing channel 222 corresponding to each of the first sensing cells SC1, and an analog-to-digital converter (ADC) 224 and a processor 226, which are connected to the sensing channel 222.

In some embodiments, each sensing channel 222 may be configured as an AFE which receives a sensing signal Sse from a first sensing cell SC1 corresponding thereto. In an example, each sensing channel 222 may be implemented as an AFE including at least one operational amplifier AMP.

The sensing channel 222 may include a first input terminal IN1 (e.g., an inverting input terminal of the operational amplifier AMP) and a second input terminal IN2 (e.g., a non-inverting input terminal of the operation amplifier AMP), and generate an output signal corresponding to a voltage difference between the first and second input terminal IN1 and IN2. For example, the sensing channel 222 may amplify (i.e., differentially amplify) a difference voltage between the first and second input terminals IN1 and IN2 to a degree corresponding to a predetermined gain and output the amplified voltage.

The second input terminal IN2 of each sensing channel 222 may be a reference potential terminal. In an example, the second input terminal IN2 may be connected to the reference voltage source GND such as a ground power source. Accordingly, the sensing channel 222 amplifies and outputs a sensing signal Sse input to the first input terminal IN1 with respect to a potential of the second input terminal IN2. That is, each sensing channel 222 receives a sensing signal Sse from a corresponding first sensing cell SC1 through the first input terminal IN1, and amplifies and outputs a signal (difference voltage) corresponding to the voltage difference between the first input terminal IN1 and the second input terminal IN2, thereby amplifying the sensing signal Sse.

In some embodiments, the operational amplifier AMP may be implemented as an integrator. A capacitor Ca and a reset switch SWr may be connected in parallel to each other between the first input terminal IN1 and an output terminal OUT1 of the operational amplifier AMP. For example, the reset switch SWr is turned on before a sensing signal Sse is sensed, so that charges of the capacitor Ca can be initialized. The reset switch SWr may be in a turn-off state at a time at which the sensing signal Sse is sensed.

The ADC 224 converts an analog signal input from each sensing channel 222 into a digital signal. In some embodiments, the ADC 224 may be provided in a number corresponding to that of second sensing electrodes to correspond one-to-one to the sensing channels 222 corresponding to the first sensing cells SC1. In another embodiment, at least two sensing channels 222 may share one ADC 224. A switch for channel selection may be additionally provided between the sensing channels 222 and the ADC 224.

The processor 226 detects a touch input by using a sensing signal Sse output from each first sensing cell SC1. For example, the processor 226 may detect whether a touch input has occurred and a position of the touch input by processing a signal (i.e., an amplified and digital-converted sensing signal Sse) input via a corresponding sensing channel 222 and a corresponding ADC 224 from each of a plurality of first sensing cells SC1 in a predetermined form which can be analyzed, and synthetically analyzing sensing signals Sse output from the first sensing cells SC1.

In some embodiments, the processor 226 may be implemented as a microprocessor (MPU). A memory necessary for driving of the processor 226 may be additionally provided in the touch sensing circuit TSC. Meanwhile, the configuration of the processor 226 is not limited thereto. In another example, the processor 226 may be implemented as a microcontroller (MCU) or the like.

In FIG. 7, in the self-capacitive mode, an exemplary relationship between the touch controller TCC and sensing cells SC1 and SC2 is illustrated.

A case where the touch controller TCC and the sensing cells SC1 and SC2 operate in the self-capacitive mode. The first sensing cell SC1 or the second sensing cell SC2 may be connected to the touch sensing circuit TSC. That is, at least some of the first sensing cell SC1 or the second sensing cell SC2 may be connected to a corresponding sensing channel 222.

Unlike the mutual-capacitive mode, in the self-capacitive mode, the first sensing cell SC1 or the second sensing cell SC2 may be connected to the first input terminal IN1 of a corresponding operational amplifier AMP. The second input terminal IN2 of the operational amplifier AMP may be connected to the touch driving circuit TDC.

The touch sensing circuit TSC may sense the first sensing cell SC1 or the second sensing cell SC2 by using a sensing signal Sse generated by a driving signal Sdr. When an object OBJ such as a finger of a user approaches the first sensing cell SC1 or the second sensing cell SC2, a sensing signal Sse is generated base on a self-capacitance formed by an object surface OE and the first sensing cell SC1 or the second sensing cell SC2. On the other hand, when an object OBJ such as a finger of a user does not approach the first sensing cell SC1 or the second sensing cell SC2, a sensing signal Sse is generated regardless of the self-capacitance. Whether the object OBJ has touched may be detected using a difference in the sensing signal Sse.

Overlapping descriptions of the touch sensing circuit TSC and the touch driving circuit TDC will be omitted.

Figure 8:
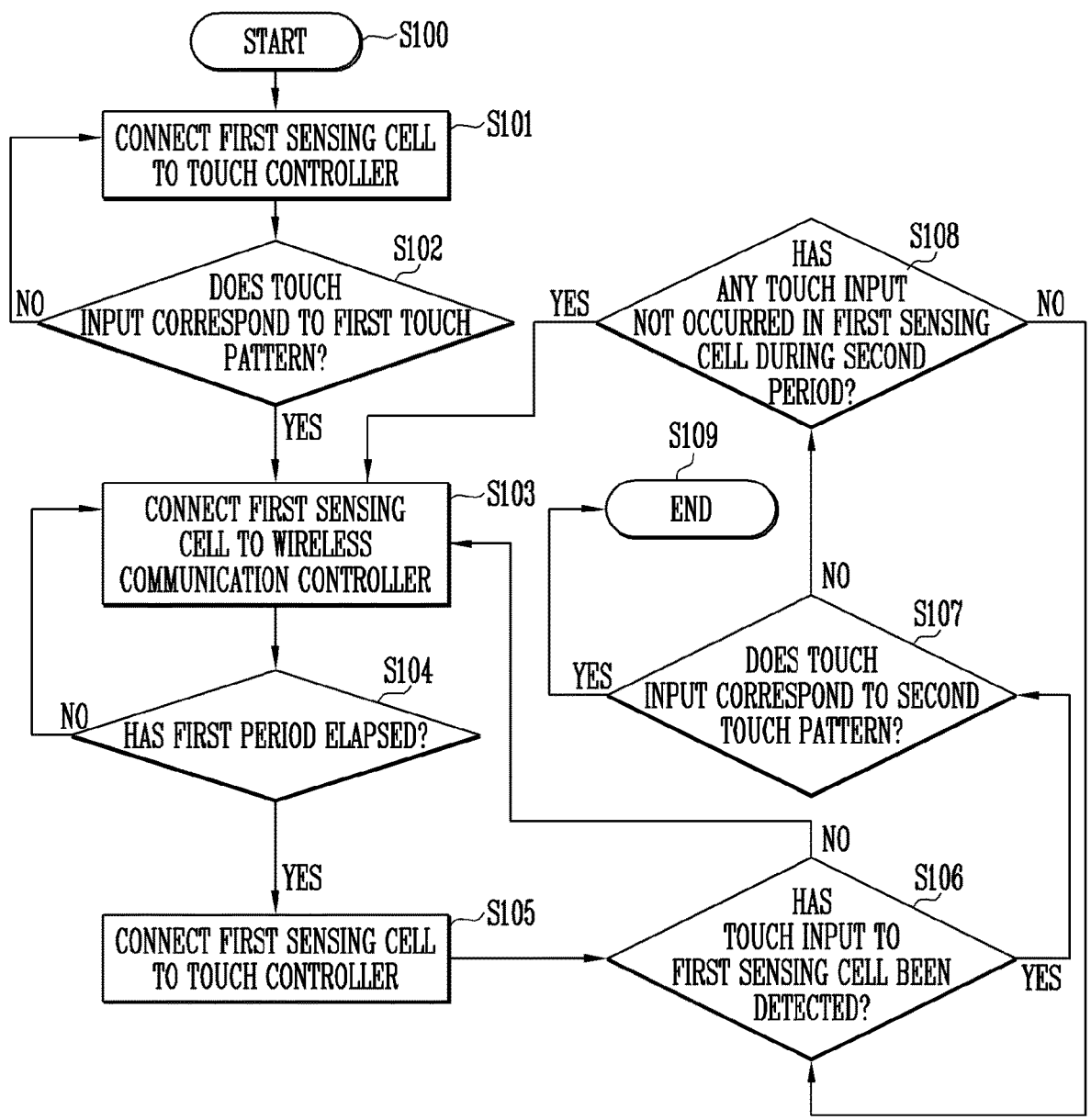
FIG. 8 is a flowchart illustrating a driving method of the display device in accordance with an embodiment of the inventive concepts.

FIG. 8 is a flowchart illustrating a driving method of the display device in accordance with an embodiment of the present disclosure.

First, there is assumed a case where the display device DP enters into a low consumption power mode such as a standby mode (S100). A first sensing cell SC11 located in the first bending area BA1 of the display area DA may be connected to the touch controller TCC (S101).

When a touch input to the first sensing cell SC11 and other sensing cells corresponds to a first touch pattern (S102), the first sensing cell SC11 may be connected to the wireless communication controller (S103). The other sensing cells may mean sensing cells located in at least one of the first bending area BA1, the third bending area BA3, and the fourth bending area BA4. That is, power is not supplied to sensing cells of the planar area PA in the standby mode, so that power consumption can be minimized. The first touch pattern may be a wake-up pattern recognized by a user to drive the display device DP in a general state (e.g., a state in which pixels display an image, and general or high power is consumed).

When a first period elapses from a time at which the display device DP enters into the step S103 (S104), the first sensing cell SC11 may be connected to the touch controller TCC (S105), to check whether a touch input has occurred in the first sensing cell SC11 (S106).

When the touch input occurs in the first sensing cell SC11, the connection between the first sensing cell SC11 and the touch controller TCC may be maintained. That is, when it is determined that an input of the user to the first sensing cell SC11 is continued or that the user grasps the first sensing cell SC11, the connection between the first sensing cell SC11 and the touch controller TCC may be maintained. When the touch input corresponds to a second touch pattern (S107), the display device DP may again enter the standby mode (S109). The second touch pattern may be a sleep pattern recognized by the user. When the touch input does not correspond to the second touch pattern (S107), the display device DP may enter the step S103, when any touch input does not occur in the first sensing cell SC11 during a second period (S108). When a touch input occurs in the first sensing cell SC11 during the second period, the display device DP may enter the step S106.

When any touch input does not occur in the first sensing cell SC11 (S106), the first sensing cell SC11 may be again connected to the wireless communication controller CCC (S103). The first sensing cell SC11 serve as an antenna.

FIGS. 9, 10, 11, 12, 13, and 14 are diagrams illustrating first areas in accordance with other embodiments of the present disclosure.

Figure 9:
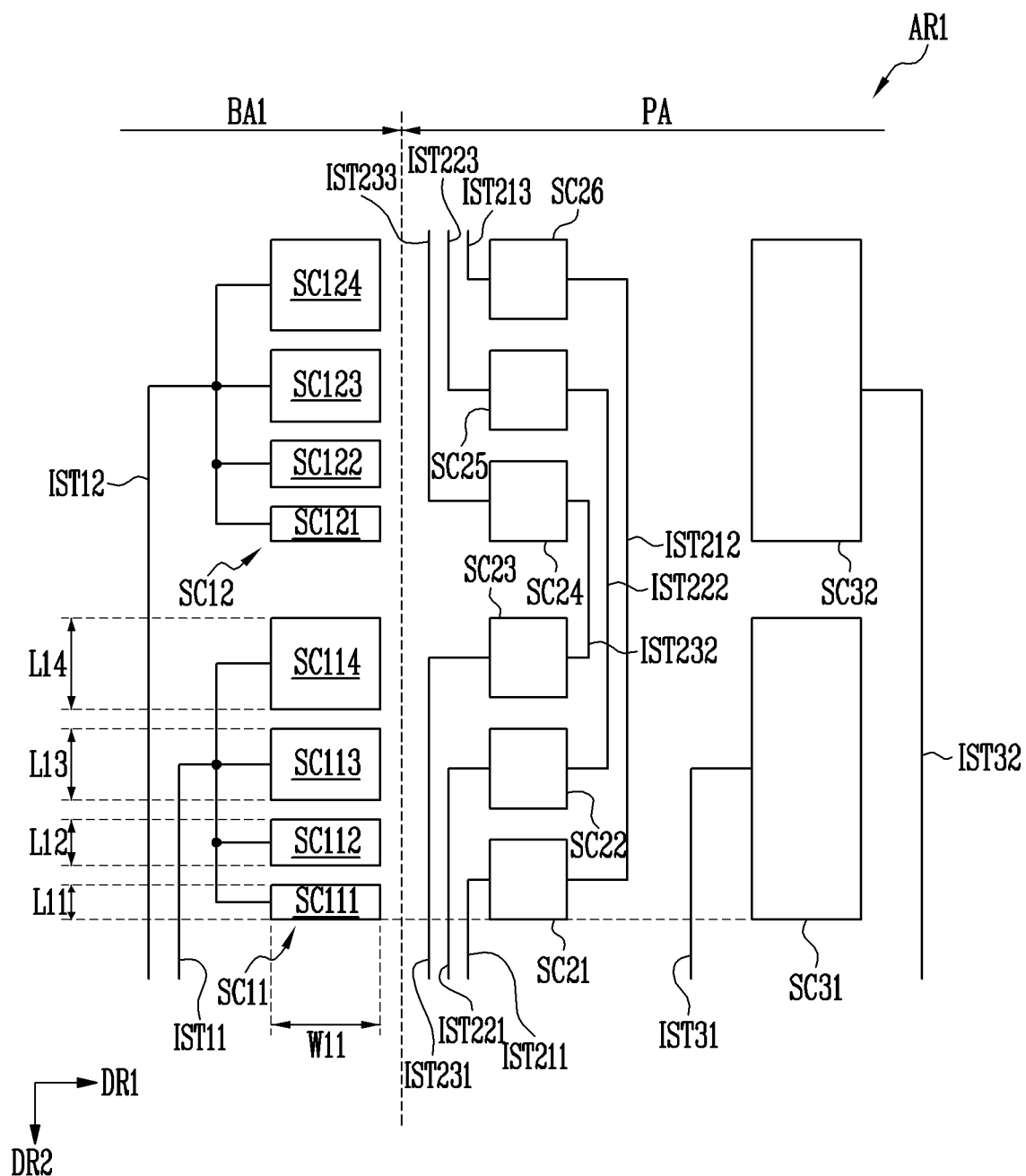
FIGS. 9, 10, 11, 12, 13 and 14 are diagrams illustrating first areas in accordance with other embodiments of the inventive concepts.

In FIG. 9, the first sensing cell SC11 may include a plurality of sub-cells SC111, SC112, SC113, and SC114.

At least two of the sub-cells SC111 to SC114 may have different shapes. The sub-cells SC111 to SC114 may be arranged in the second direction DR2. For example, the sub-cells SC111 to SC114 may have the same length W11 in the first direction DR1, but lengths L11, L12, L13, and L14 of the sub-cells SC111 to SC114 in the second direction DR2 may be different from one another. The length L11 to L14 of the sub-cells SC111 to SC114 in the second direction DR2 may sequentially decrease in the second direction DR2. In another embodiment, the length L11 to L14 of the sub-cells SC111 to SC114 in the second direction DR2 may sequentially increase in the second direction DR2.

The shape of each of the sub-cells SC111 to SC114 may be matched to a frequency band of a wireless signal to be transmitted or received. That is, the sub-cells SC111 to SC114 may be patch antennae of different frequency bands. For example, the sub-cell SC114 having the longest length L14 may transmit or receive a wireless signal of the lowest frequency band, and the sub-cell SC111 having the shortest length L11 may transmit or receive a wireless signal of the highest frequency band. That is, when the length W11 of the sub-cells SC111 to SC114 in the first direction DR1 is fixed, the sub-cells SC111 to SC114 may transmit or receive a wireless signal of a lower frequency band as the lengths L11 to L14 of the sub-cells SC111 to SC114 in the second direction DR2 become longer.

For example, the wireless communication controller CCC performs band-pass filtering on wireless signals of a plurality of frequency bands, which are received through the first sensing line IST11, to receive a wireless signal of a desired frequency band.

Similarly, the first sensing cell SC12 may include a plurality of sub-cells SC121, SC122, SC123, and SC124. The sub-cells SC121, SC122, SC123, and SC124 may correspond to (e.g., be equal to) the above-described sub-cells SC111, SC112, SC113, and SC114, and therefore, overlapping descriptions will be omitted.

Figure 10:
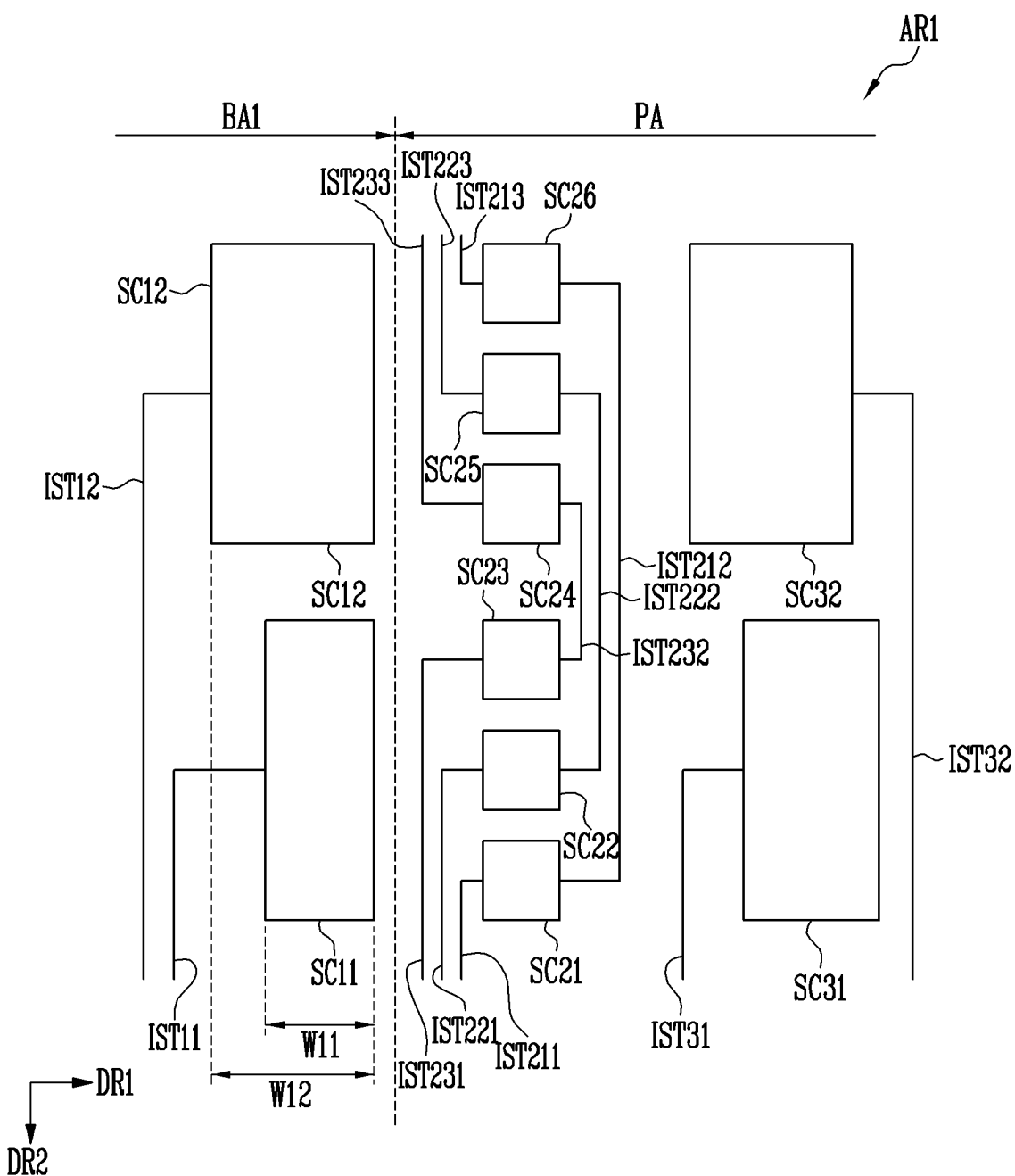

In FIG. 10, an area of the first sensing cell SC12 most adjacent to the first sensing cell SC11 in the opposite direction of the second direction DR2 may be greater than that of the first sensing cell SC11. The first sensing line IST12 extending from the first sensing cell SC12 to the multiplexer MUX may be longer than the first sensing line IST11 extending from the first sensing cell SC11 to the multiplexer MUX. Therefore, since an IR drop amount of the first sensing cell SC12 is relatively large, the first sensing cell SC12 may be configured to have an area greater than that of the first sensing cell SC11 so as to compensate for the relatively large IR drop amount. This configuration is possible since a number of sensing lines located in the opposite direction of the first direction DR1 of the first sensing cell SC12 is smaller than that of sensing lines located in the opposite direction of the first direction DR1 of the first sensing cell SC11. In accordance with this embodiment, based on one column of the first sensing cells SC11 and SC12, the areas of the first sensing cells SC11 and SC12 may sequentially decrease in the second direction DR2 (e.g., as the first sensing cells SC11 and SC12 come close to the multiplexer MUX).

Similarly, an area of the third sensing cell SC32 may be greater than that of the third sensing cell SC31. Therefore, overlapping descriptions will be omitted.

Figure 11:
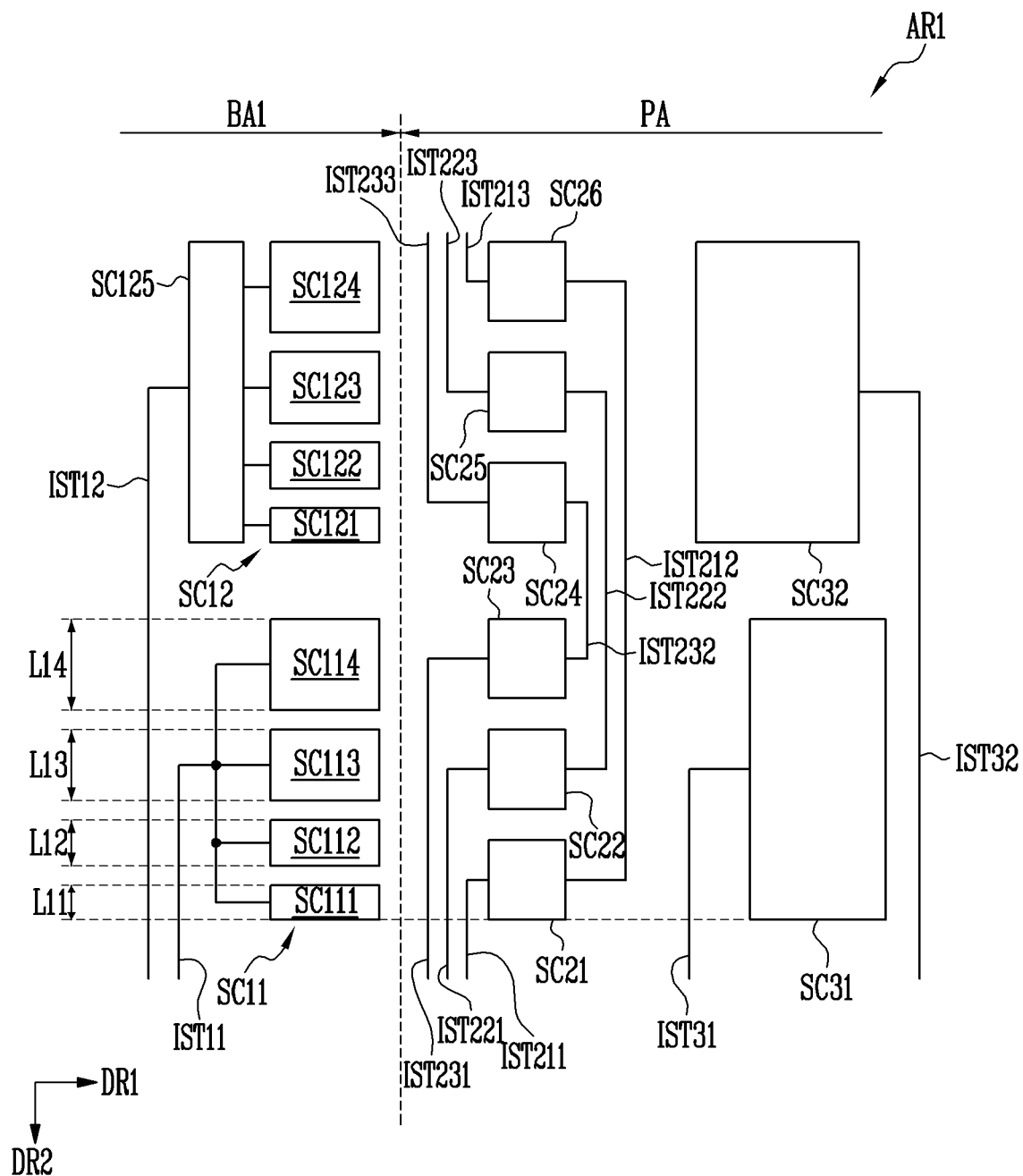

In FIG. 11, based on the embodiment shown in FIG. 10, the first sensing cell SC11 may include a plurality of first sub-cells SC111 to SC114, and at least two of the first sub-cells SC111 to SC114 may have different shapes. The first sensing cell SC11 may include a plurality of second sub-cells SC121, SC122, SC123, SC124, and SC125, and at least two of the second sub-cells 121 to 125 may have different shapes. A number of the second sub-cells 121 to 125 may be greater than that of the first sub-cells SC111 to SC114.

That is, since an area of the first sensing cell SC12 is greater than that of the first sensing cell SC11, the first sensing cell SC12 may further include at least one second sub-cell SC125 as compared with the first sensing cell SC11. In accordance with this embodiment, an IR drop of the first sensing cell SC12 can be compensated, and simultaneously, wireless signals of more various frequency bands can be transmitted or received.

Figure 12:
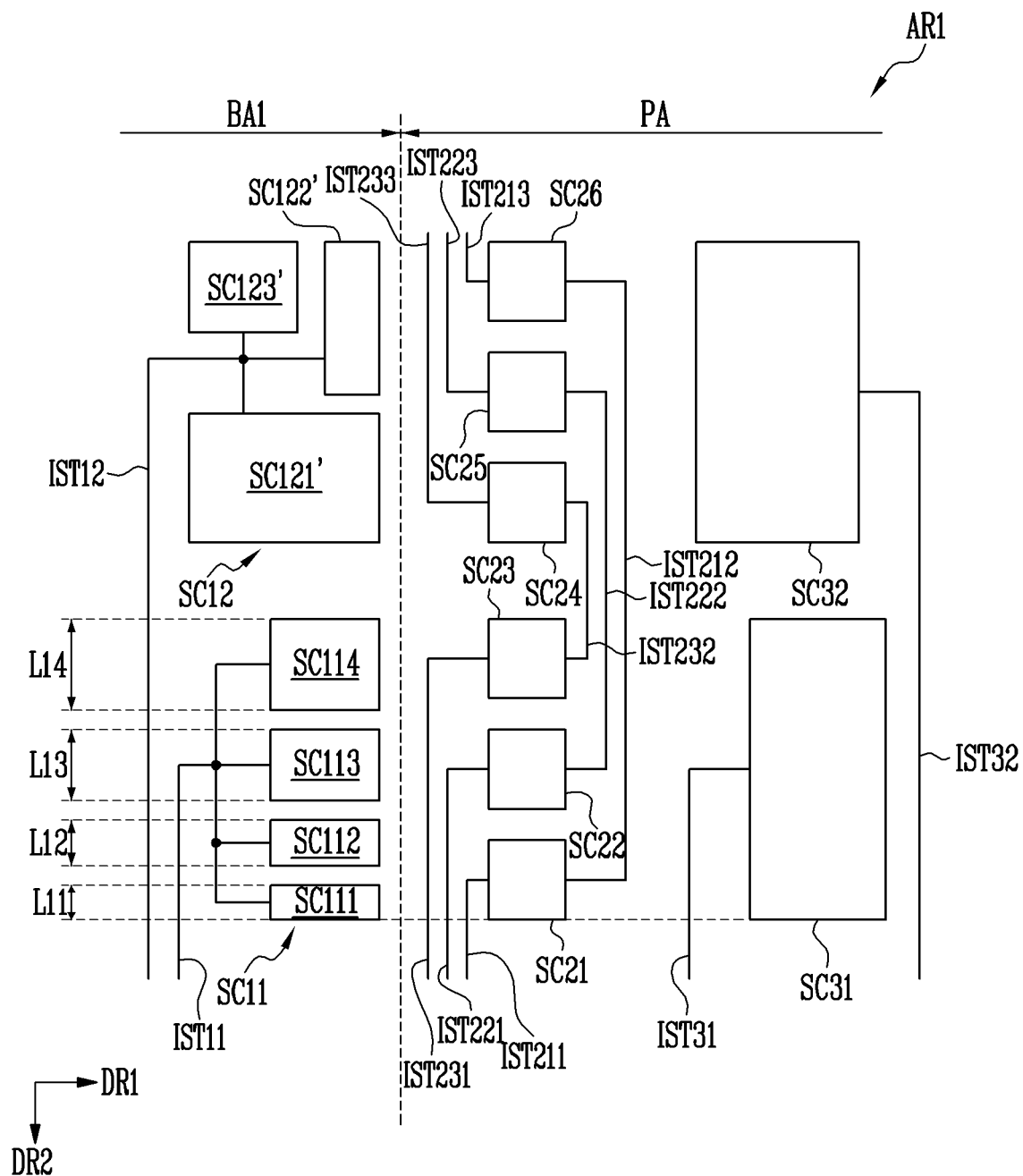

In FIG. 12, shapes of sub-cells SC121', SC122', and SC123' of the first sensing cell SC12 may not correspond to those of sub-cells SC111 to SC114 of the first sensing cell SC11. In accordance with this embodiment, an IR drop of the first sensing cell SC12 can be compensated, and simultaneously, a wireless signal of a customized frequency band can be transmitted or received.

Figure 13:
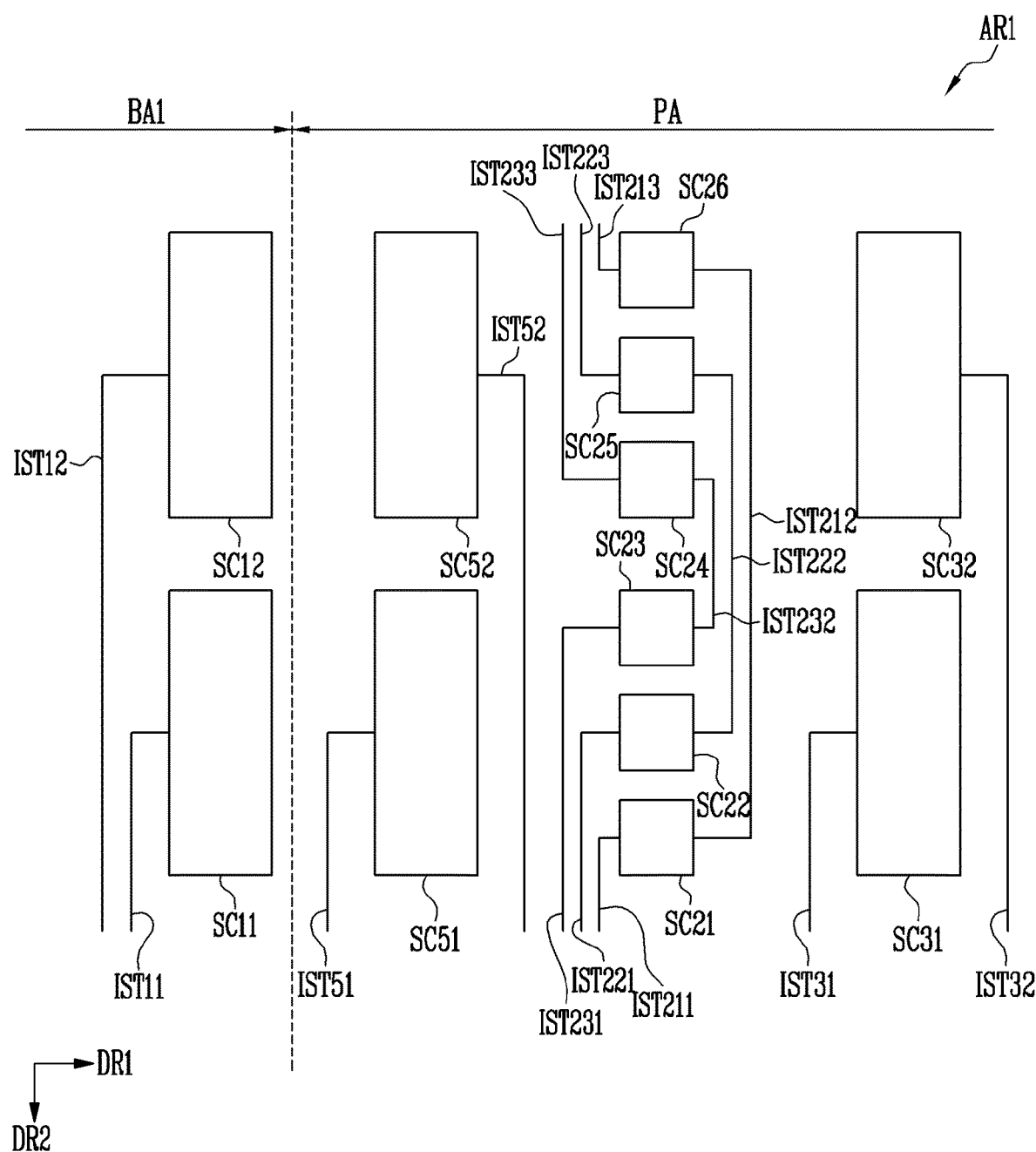

In FIG. 13, the display device DP may further include fifth sensing cells SC51 and SC52 and fifth sensing lines IST51 and IST52. The fifth sensing cells SC51 and SC52 may be sensing cells most adjacent to a boundary of the planar area PA of the display area DA in the opposite direction of the first direction DR1. The shapes and functions of the fifth sensing cells SC51 and SC52 and the fifth sensing lines IST51 and IST52 may correspond to those of the third sensing cells SC31 and SC32 and the third sensing lines IST31 and IST32, and therefore, overlapping descriptions will be omitted.

In accordance with this embodiment, the first sensing cells SC11 and SC12 located in the first bending area BA1 can be driven by using the self-capacitive method, and the sensing cells located in the planar area PA can be driving by using the mutual-capacitive method.

In FIG. 14, an example in which sensing cells are configured in the shape of a mesh is illustrated. When the sensing cells are configured in the shape of a mesh, an opaque conductive material may be used as the material of the sensing cells and sensing lines. Accordingly, a low-resistance material can be used as the material of the sensing cells and the sensing lines.

As described above, the pixels PX can overlap with openings of a corresponding mesh in the third direction DR3, and thus there is no problem when an image is viewed by a user.

Figure 15:
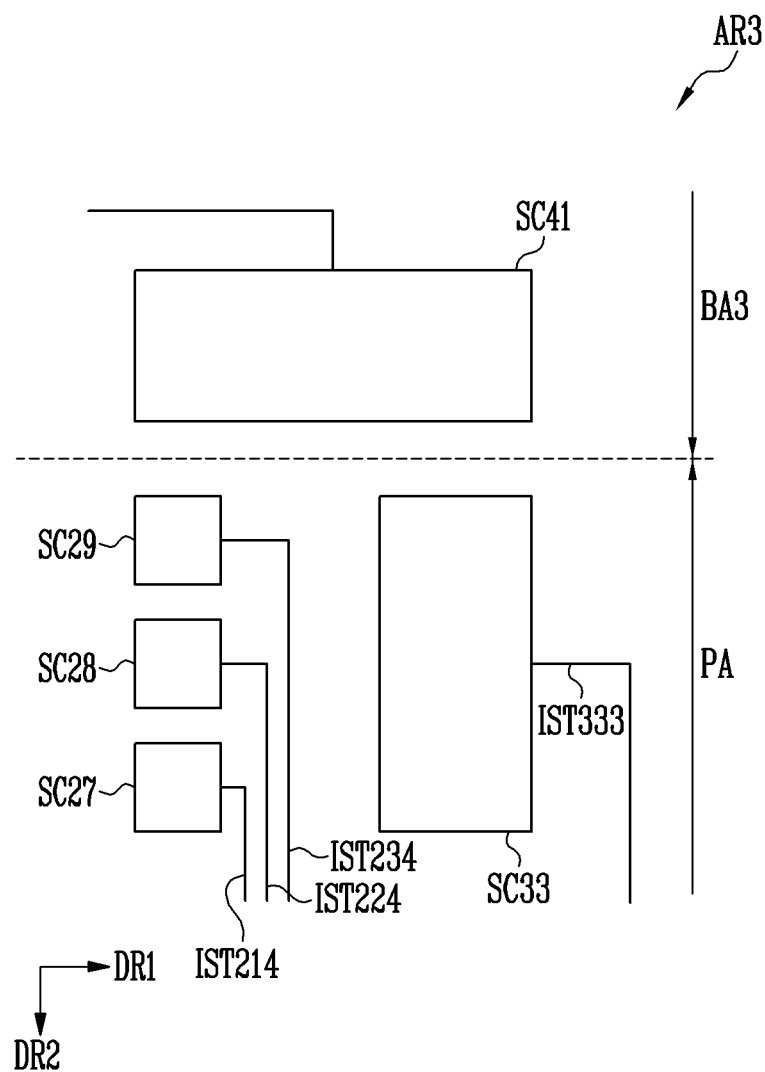
FIG. 15 is a diagram illustrating a third area in accordance with an embodiment of the inventive concepts.

FIG. 15 is a diagram illustrating a third area in accordance with an embodiment of the present disclosure.

The third area AR3 may include a portion of the third bending area BA3 and a portion of the planar area PA.

A fourth sensing cell SC41 may be in the third bending area BA3. The fourth sensing cell SC41 may be connected to the multiplexer MUX through a fourth sensing line. A plurality of fourth sensing cells may be arranged in the first direction DR1 on the third bending area BA3.

Second sensing cells SC27, SC28, and SC29, second sensing lines IST214, IST224, and IST234, a third sensing cell SC33, and a third sensing line IST333 are the same as described above, and therefore, overlapping descriptions will be omitted.

The fourth sensing cell SC41 along with the second sensing cell SC29 or the third sensing cell S33 may be driven by using the mutual-capacitive method or be driven by using the self-capacitive method.

Figure 16:
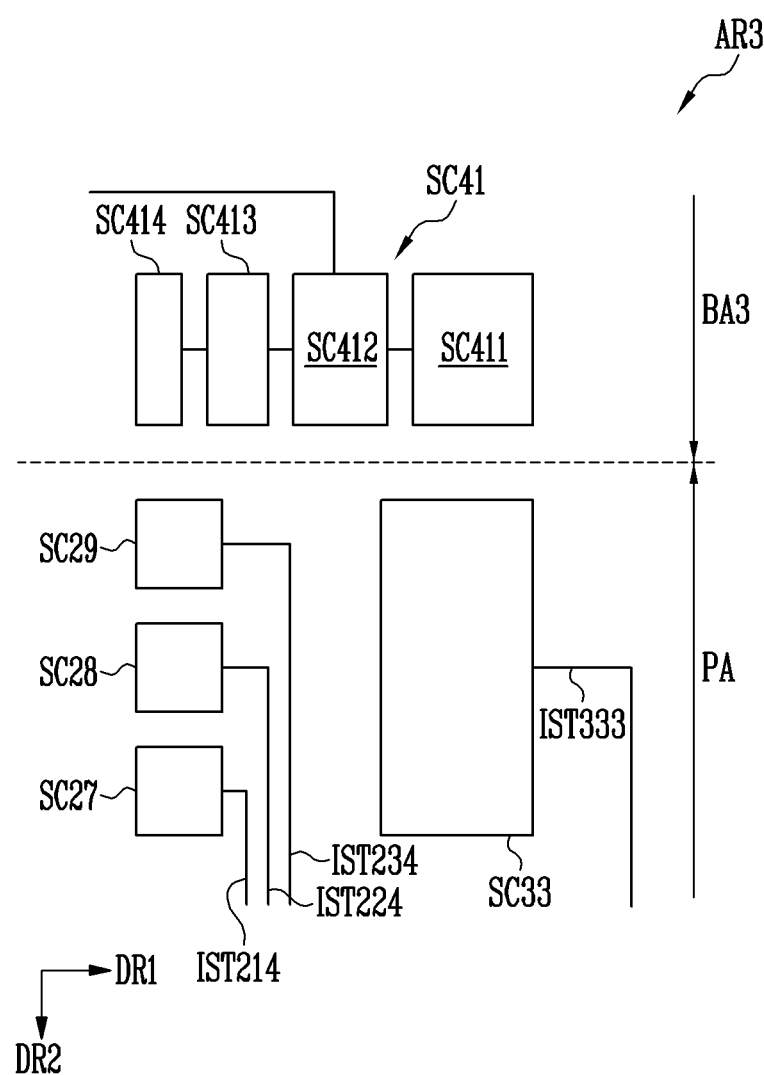
FIG. 16 is a diagram illustrating a third area in accordance with another embodiment of the inventive concepts.

FIG. 16 is a diagram illustrating a third area in accordance with another embodiment of the present disclosure.

The fourth sensing cell S41 may include a plurality of sub-cells SC411, SC412, SC413, and SC414, and at least two of the sub-cells SC411, SC412, SC413, and SC414 may have different shapes.

The sub-cells SC411, SC412, SC413, and SC414 may be arranged in the first direction DR1. For example, the sub-cells SC411 to SC414 may have the same length in the second direction DR2, but lengths of the sub-cells SC411 to SC414 in the first direction DR1 may be different from one another. The lengths of the sub-cells SC411 to SC414 in the first direction DR1 may sequentially decrease in the first direction DR1. In another embodiment, the lengths of the sub-cells SC411 to SC414 in the first direction DR1 may sequentially increase in the first direction DR1.

Figure 17:
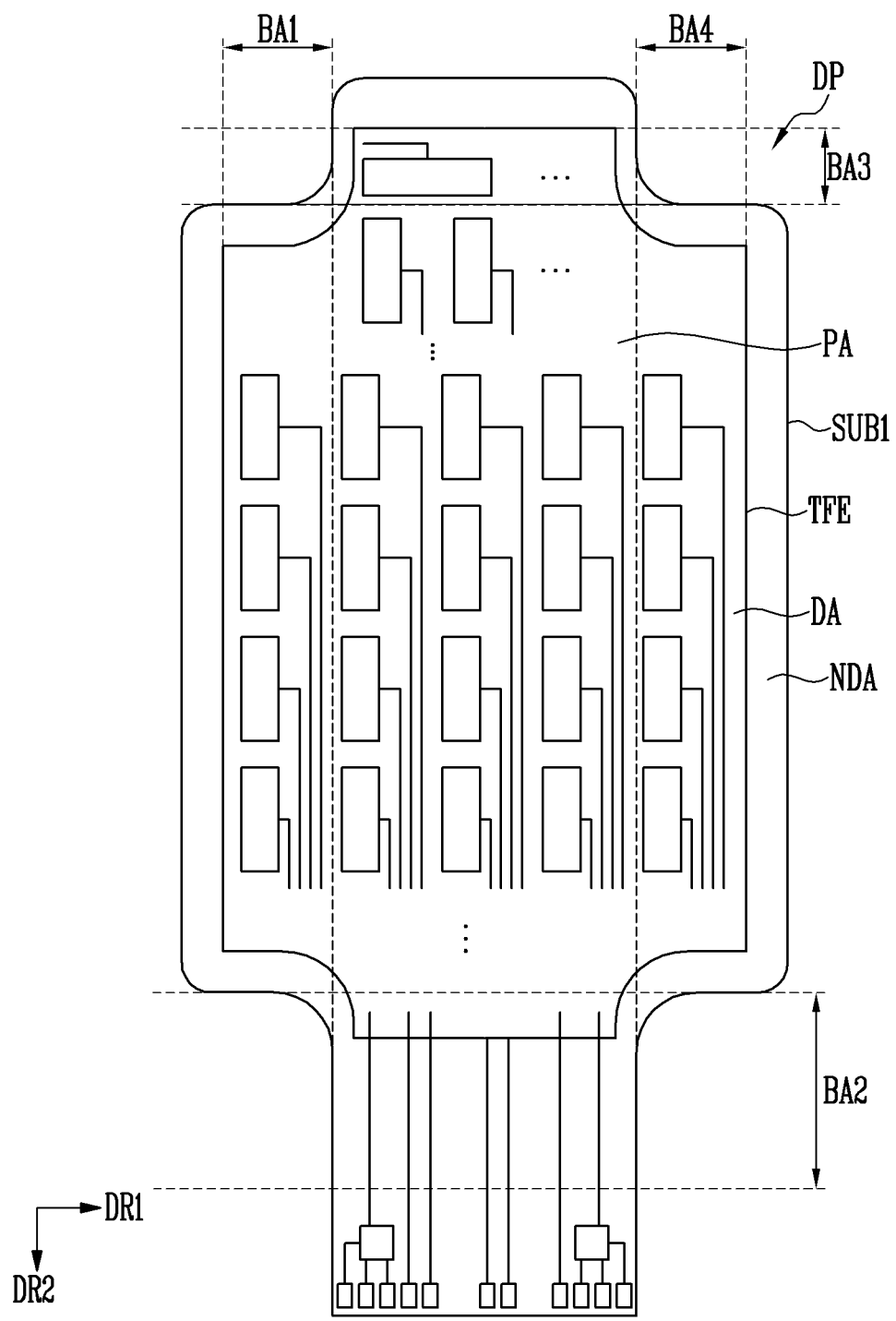
FIG. 17 is a diagram illustrating a display device in accordance with another embodiment of inventive concepts.

FIG. 17 is a diagram illustrating a display device in accordance with another embodiment of the present disclosure.

In FIG. 17, sensing cells disposed in the planar area PA and the bending areas BA1, BA3, and BA4 may be respectively connected to dedicated sensing lines. That is, a number of the sensing cells and a number of the sensing lines may be equal to each other. This structure is advantageous in sensing using the self-capacitive method.

Figure 18:
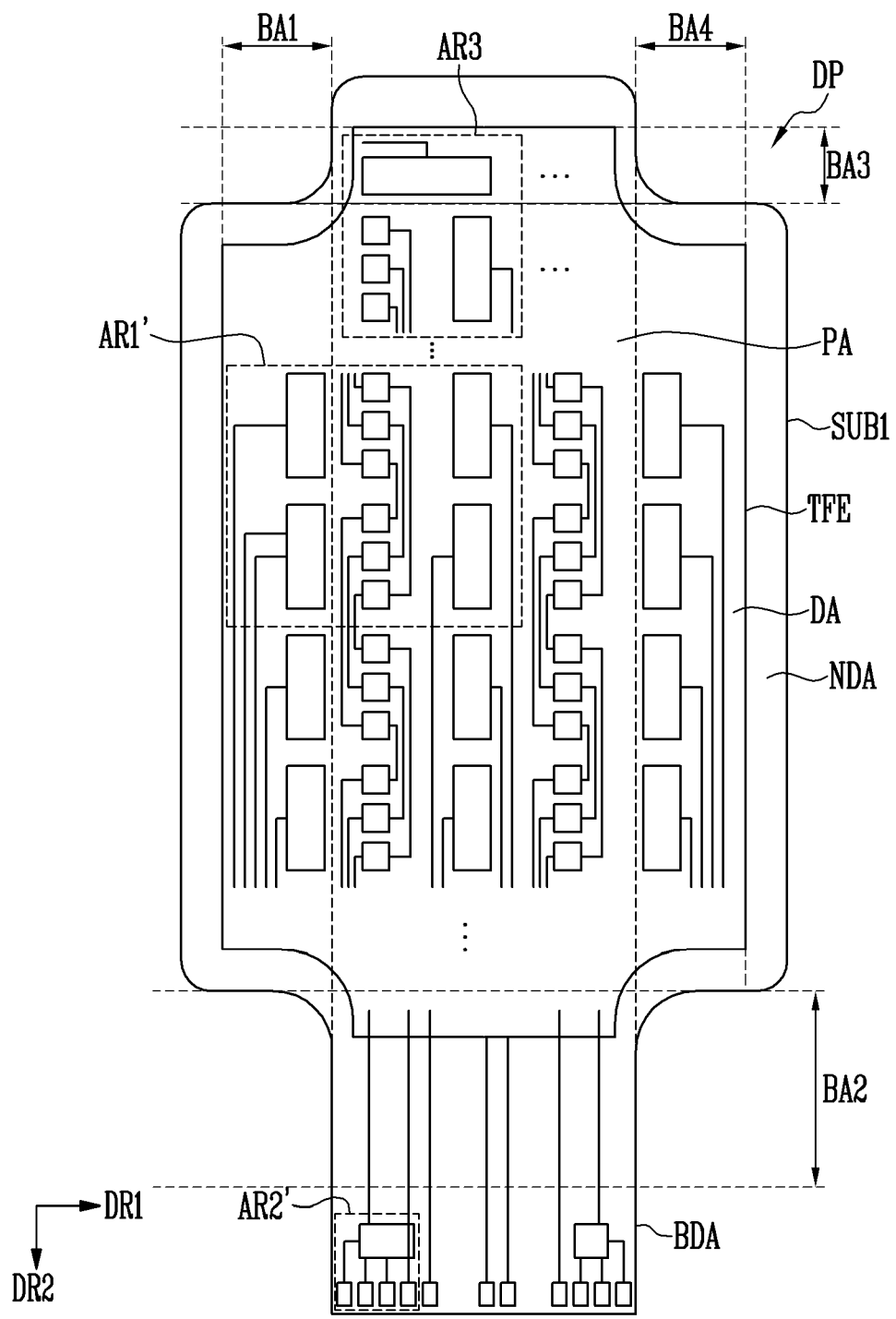
FIG. 18 is a diagram illustrating a display device in accordance with still another embodiment of the inventive concepts.
Figure 19:
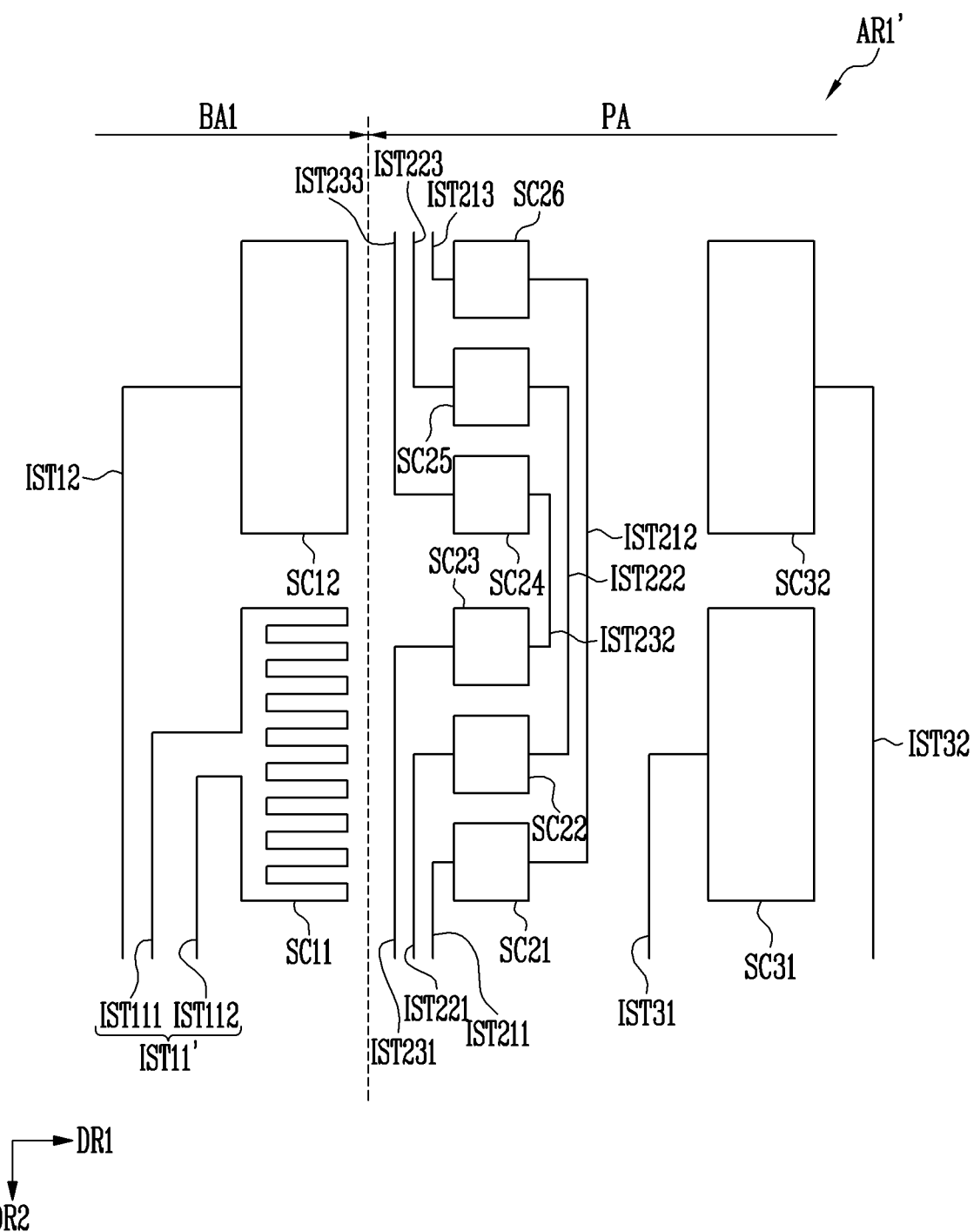
FIG. 19 is a diagram illustrating a first area of the display device shown in FIG. 18.
Figure 20:
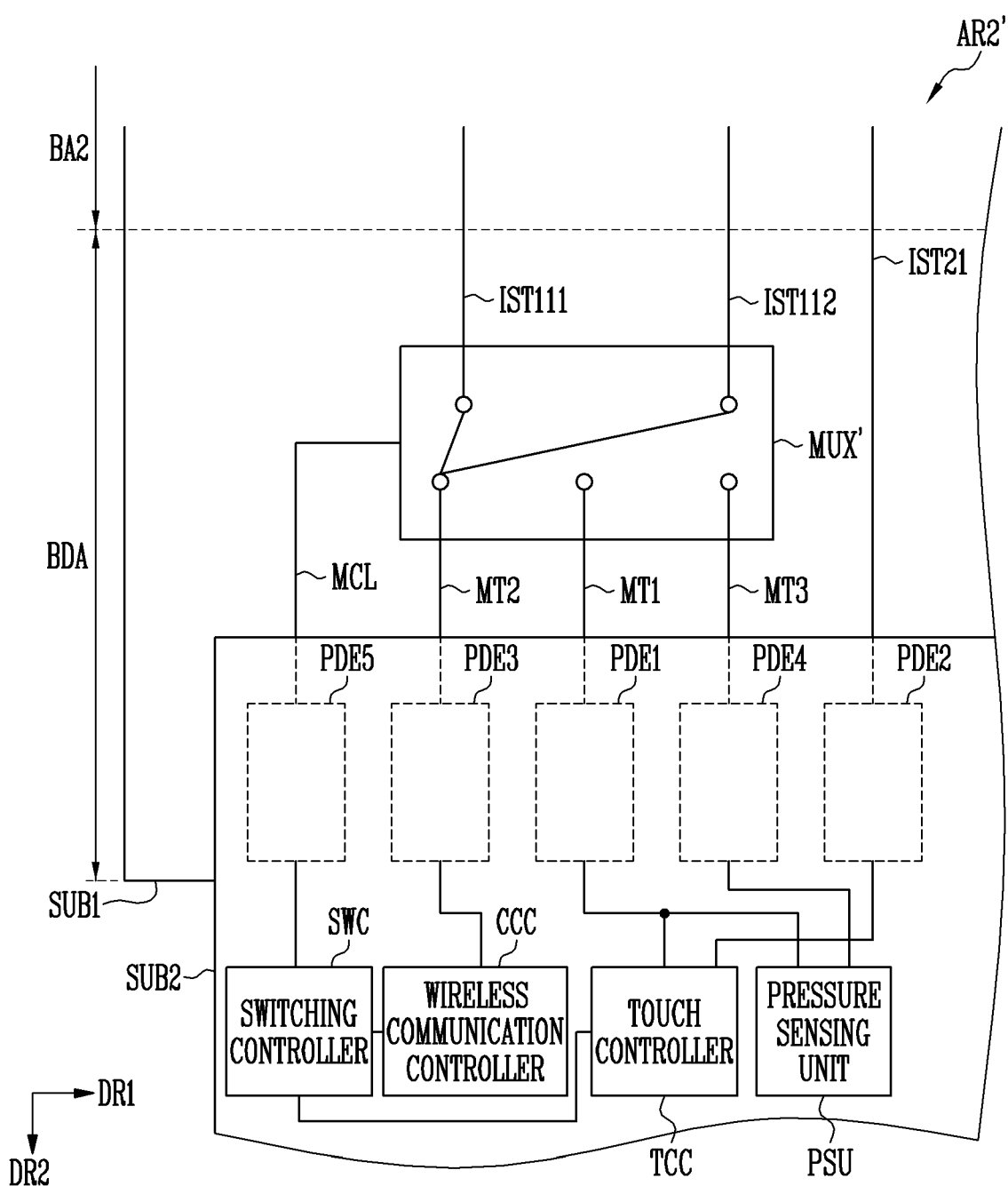
FIGS. 20, 21 and 22 are diagrams illustrating a second area of the display device shown in FIG. 18.
Figure 21:
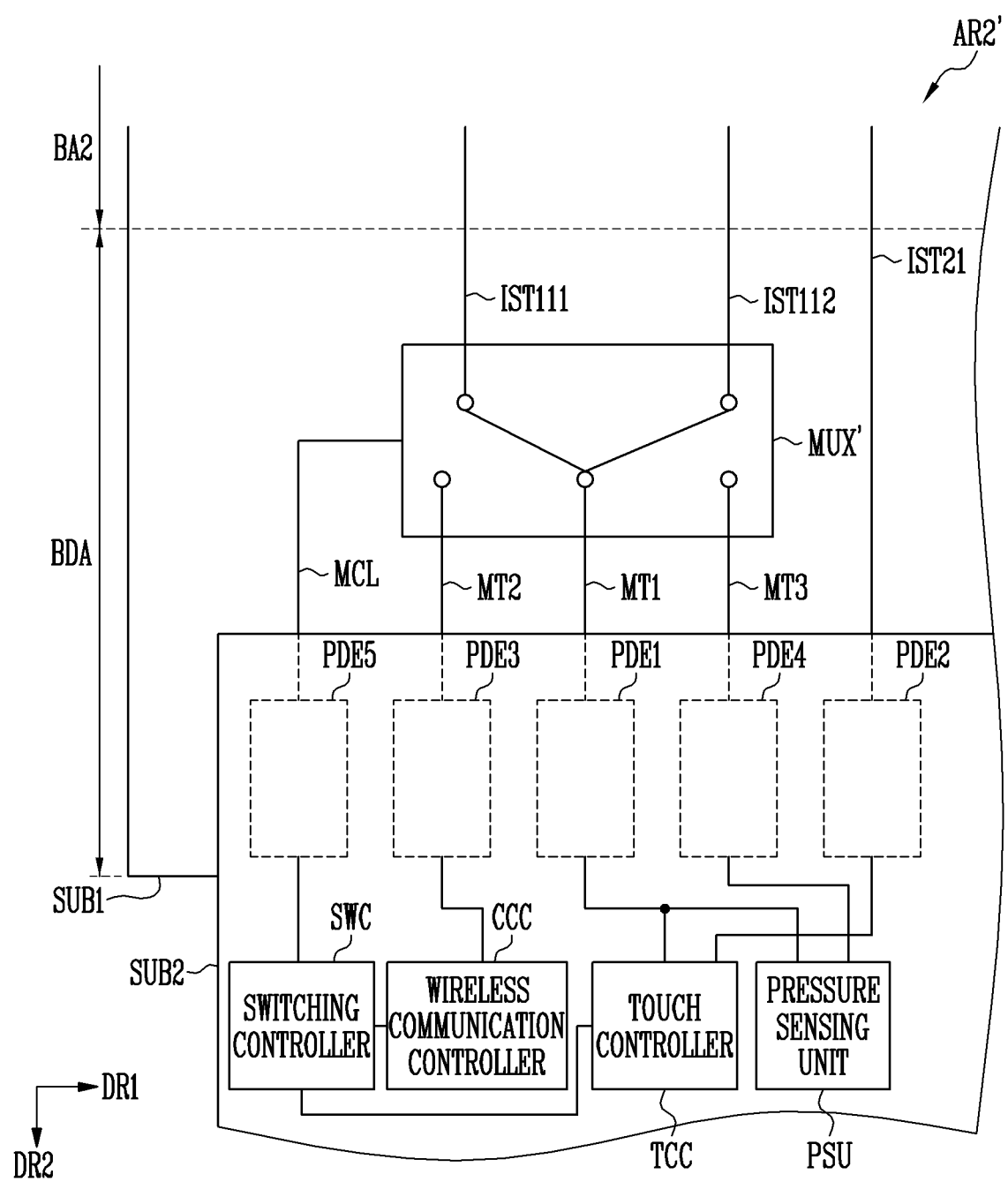
Figure 22:
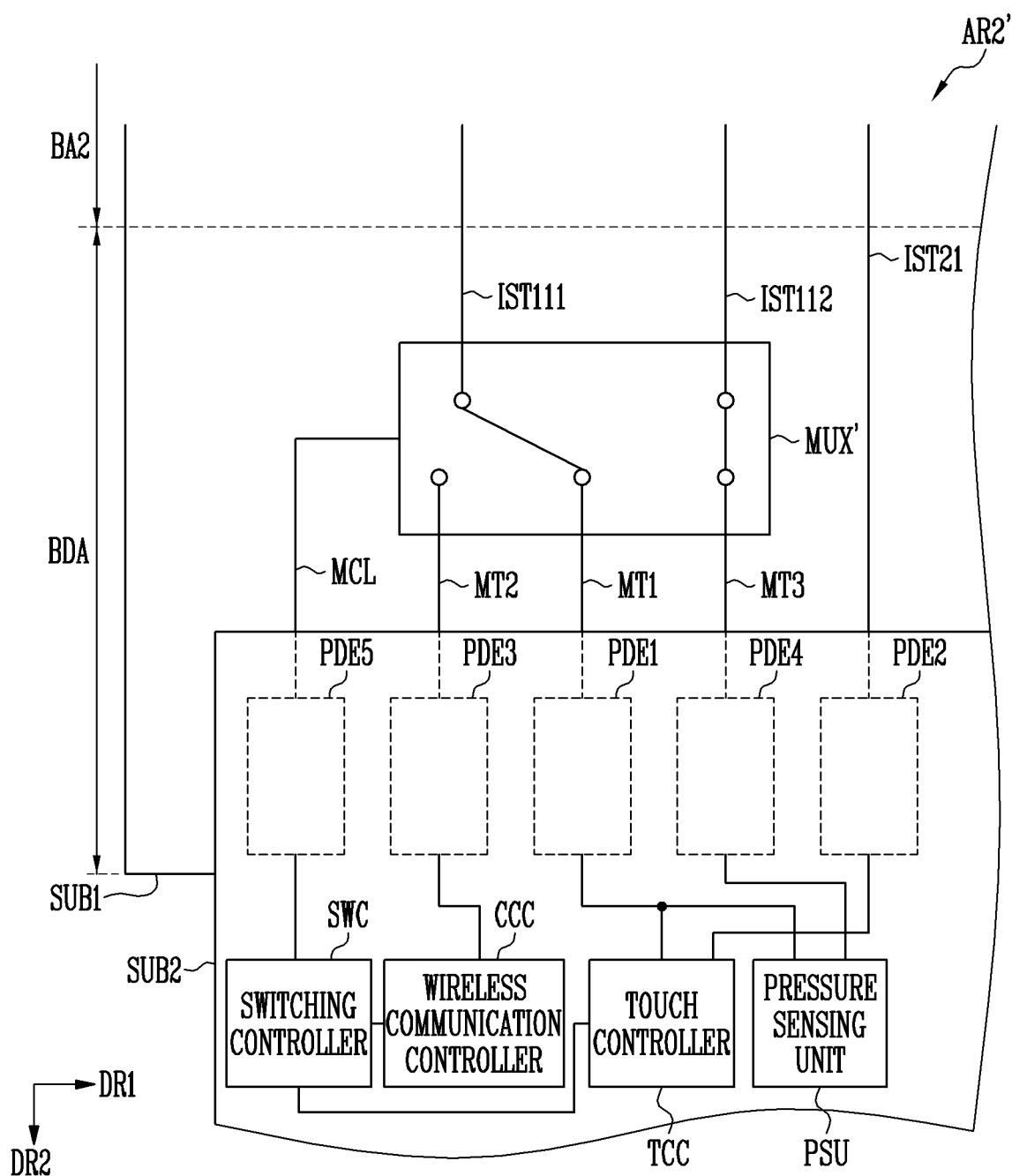

FIG. 18 is a diagram illustrating a display device in accordance with still another embodiment of the present disclosure. FIG. 19 is a diagram illustrating a first area of the display device shown in FIG. 18. FIGS. 20, 21, and 22 are diagrams illustrating a second area of the display device shown in FIG. 18.

Referring to a first area AR1' shown in FIG. 19, at least one first sensing cell SC11 among a plurality of first sensing cells may be connected to two first sensing lines IST111 and IST112.

For example, the first sensing cell SC11 may be a variable resistor. The first sensing line IST111 may be connected to one end of the variable resistor, and the first sensing line IST112 may be connected to the other end of the variable resistor. The variable resistor may be, for example, a strain gauge.

In some embodiments, the first sensing line IST111 and the first sensing line IST112 may constitute a first sensing line IST11'. The length of the first sensing line IST11' may be changed depending on a pressure at which a user presses the first sensing cell SC11, and therefore, the resistance value of the variable resistor may be changed. For example, the length of the first sensing line IST11' becomes longer as the user more strongly presses the first sensing cell SC11, i.e., as pressure becomes larger. Therefore, the resistance value of the variable resistor may be increased.

Referring to a second area AR2' shown in FIGS. 20 to 22, the first sensing lines IST111 and IST112 may be connected to a multiplexer MUX'. A fourth pad PDE4 may be connected to the multiplexer MUX' through a third multiplexer line MT3.

A pressure sensing unit PSU may be connected to a first pad PDE1 and the fourth pad PDE4. The pressure sensing unit PSU may be mounted on a second substrate SUB2. A switching controller SWC may apply a multiplexer control signal to a multiplexer control line MCL, based on a wireless communication controller CCC, a touch controller TCC, and the pressure sensing unit PSU.

In FIG. 20, when the first sensing cell SC11 operates as an antenna, the multiplexer MUX' may connect the first sensing line IST111 and the first sensing line IST112 to a second multiplexer line MT2.

In FIG. 21, when the first sensing cell SC11 operates as a touch sensor, the multiplexer MUX' may connect the first sensing line IST111 and the first sensing line IST112 to a first multiplexer line MT1.

In FIG. 22, when the first sensing cell SC11 operates as a pressure sensor, the multiplexer MUX' may connect the first sensing line IST111 to the first multiplexer line MT1, and connect the first sensing line IST112 to the third multiplexer line MT3. Therefore, a current may flow through the first sensing line IST11, the variable resistor, and the first sensing line IST112. The pressure sensor may determine that a pressure input becomes larger as a current flowing in the first sensing lines IST111 and IST112 becomes smaller (as a variable resistance value becomes larger).

In accordance with this embodiment, the first sensing cell SC11 at a specific position can operate as a pressure sensor for input of a wake-up pattern, and thus power is supplied to only the first sensing cell SC11 in a standby mode or low consumption power mode of the display device DP.

In FIGS. 20 to 22, one multiplexer control line MCL and one fifth pad PDE5 connected thereto are illustrated. However, if necessary, a plurality of multiplex control lines MCL and a plurality of fifth pads PDE5 may be provided. For example, in order to express three states shown in FIGS. 20 to 22, two multiplex control lines MCL and two fifth pads PDE5 may be provided.

Figure 23:
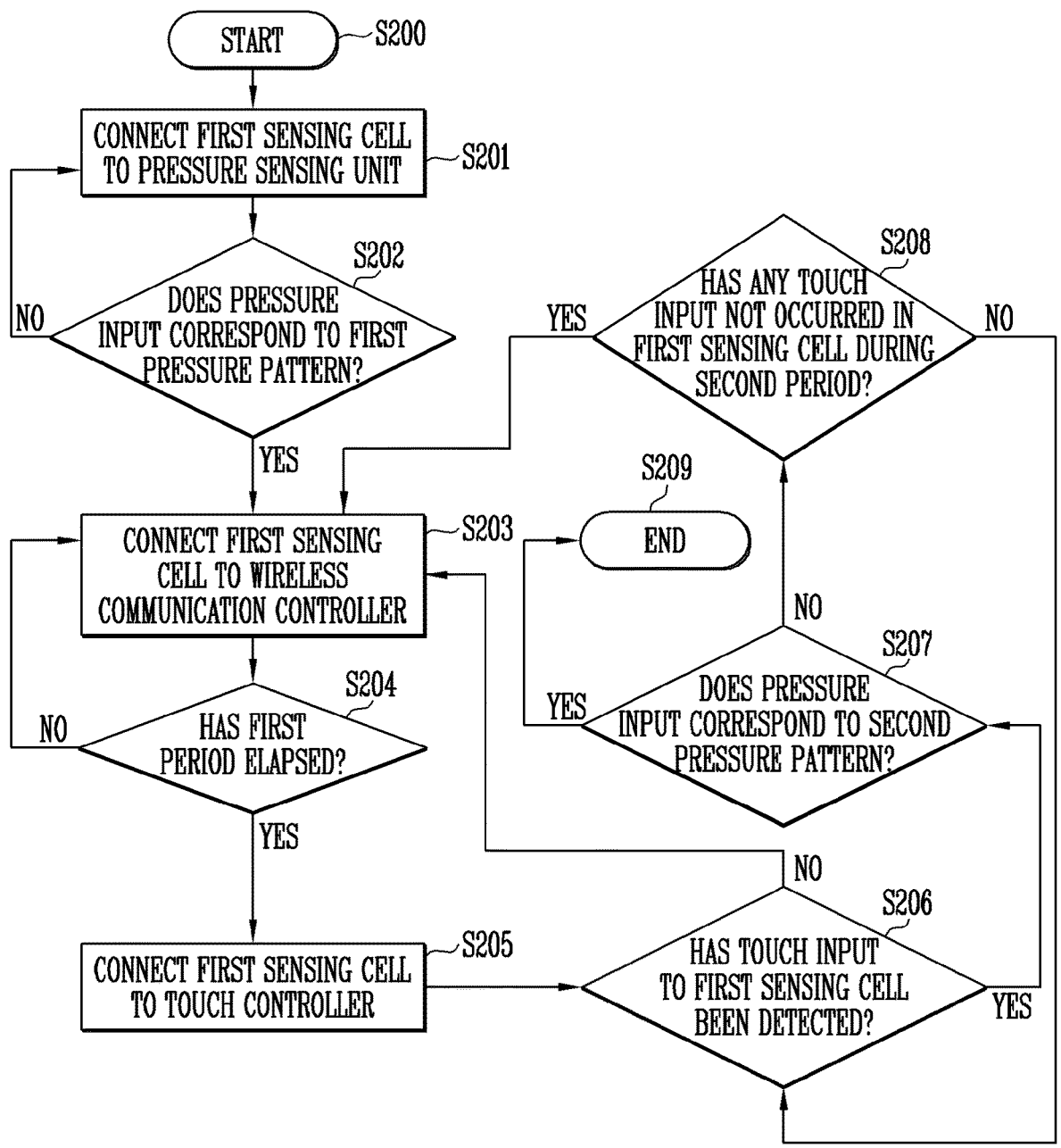
FIG. 23 is a flowchart illustrating a driving method of the display device shown in FIG. 18.

FIG. 23 is a flowchart illustrating a driving method of the display device shown in FIG. 18.

First, there is assumed a case where the display device DP enters a low consumption power mode such as a standby mode (S100). A first sensing cell SC11 located in the first bending area BA1 of the display area DA may be connected to the pressure sensing unit PSU (S201).

When a pressure input to the first sensing cell SC11 corresponds to a first pressure pattern (S202), the first sensing cell SC11 may be connected to the wireless communication controller CCC (S203). As described above, power is not supplied to other sensing cells except the first sensing cell SC11 at a specific position in the standby mode, so that power consumption can be minimized. The first pressure pattern may be a wake-up pattern recognized by a user so as to drive the display device DP in a general state (e.g., a state in which pixels display an image, and general or high power is consumed). The first pressure pattern may include at least one of a pressure having a specific strength or more or a pressure having a specific time or more.

When a first period elapses from a time at which the display device DP enters into the step S103 (S204), the first sensing cell SC11 may be connected to the touch controller TCC (S205), to check whether a touch input has occurred in the first sensing cell SC11 (S206).

When the touch input occurs in the first sensing cell SC11, the connection between the first sensing cell SC11 and the touch controller TCC may be maintained. That is, when it is determined that an input of the user to the first sensing cell SC11 is continued or that the user grasps the first sensing cell SC11, the connection between the first sensing cell SC11 and the touch controller TCC may be maintained. When the pressure input corresponds to a second pressure pattern (S207), the display device DP may again enter into the standby mode (S209). The second pressure pattern may be a sleep pattern recognized by the user. The second pressure pattern may include at least one of a pressure having a specific strength or more or a pressure having a specific time or more.

When the pressure input does not correspond to the second pressure pattern (S207) and when any touch input does not occur in the first sensing cell SC11 during a second period (S208), the display device DP may enter into the step S203. When a touch input occurs in the first sensing cell SC11 during the second period (S208), the display device DP may enter into the step S206.

When any touch input does not occur in the first sensing cell SC11 (S206), the first sensing cell SC11 may be again connected to the wireless communication controller CCC (S203). The first sensing cell SC11 serve as an antenna.

Figure 24:
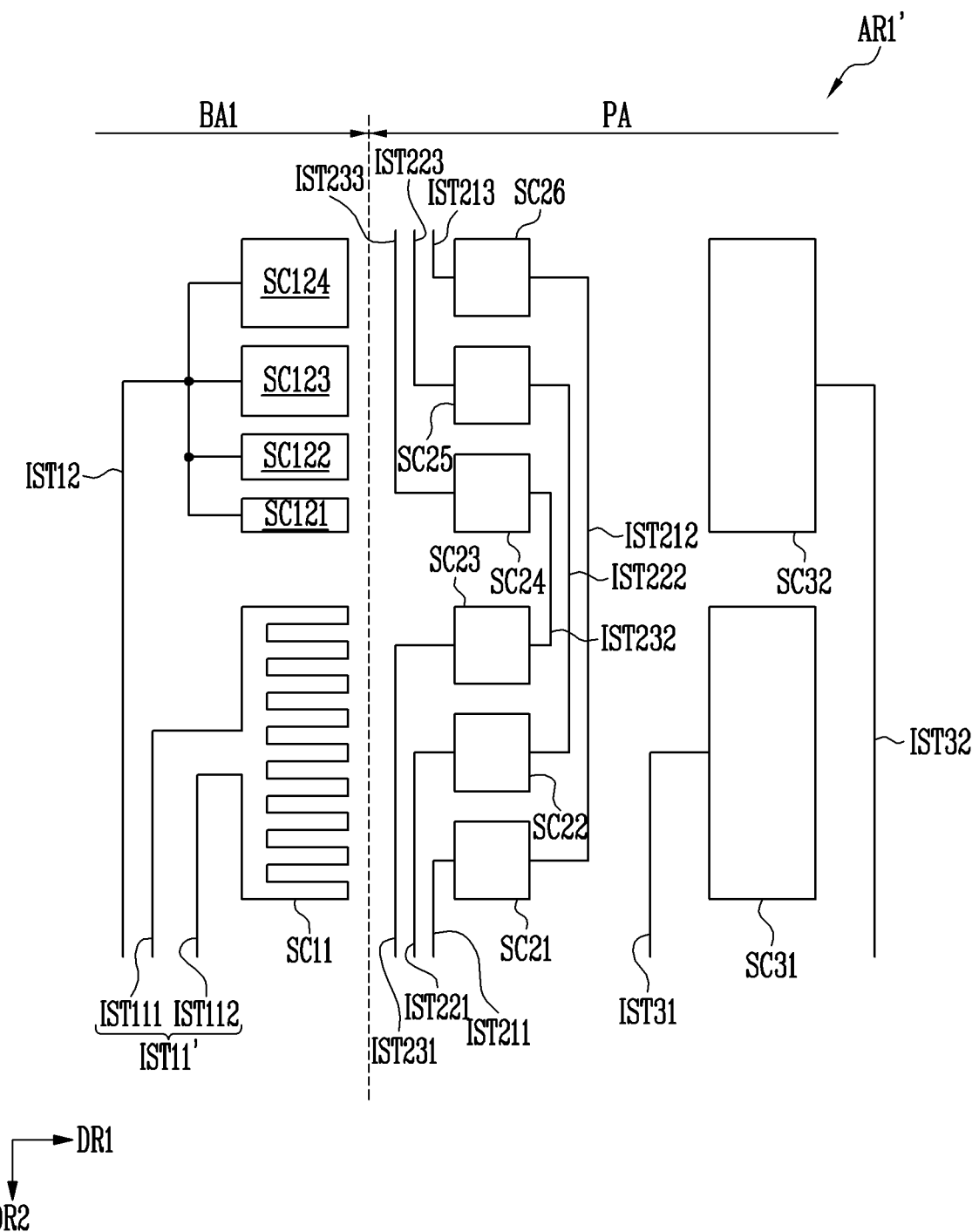
FIGS. 24 and 25 are diagrams illustrating first areas in accordance with other embodiments different from FIG. 19.
Figure 25:
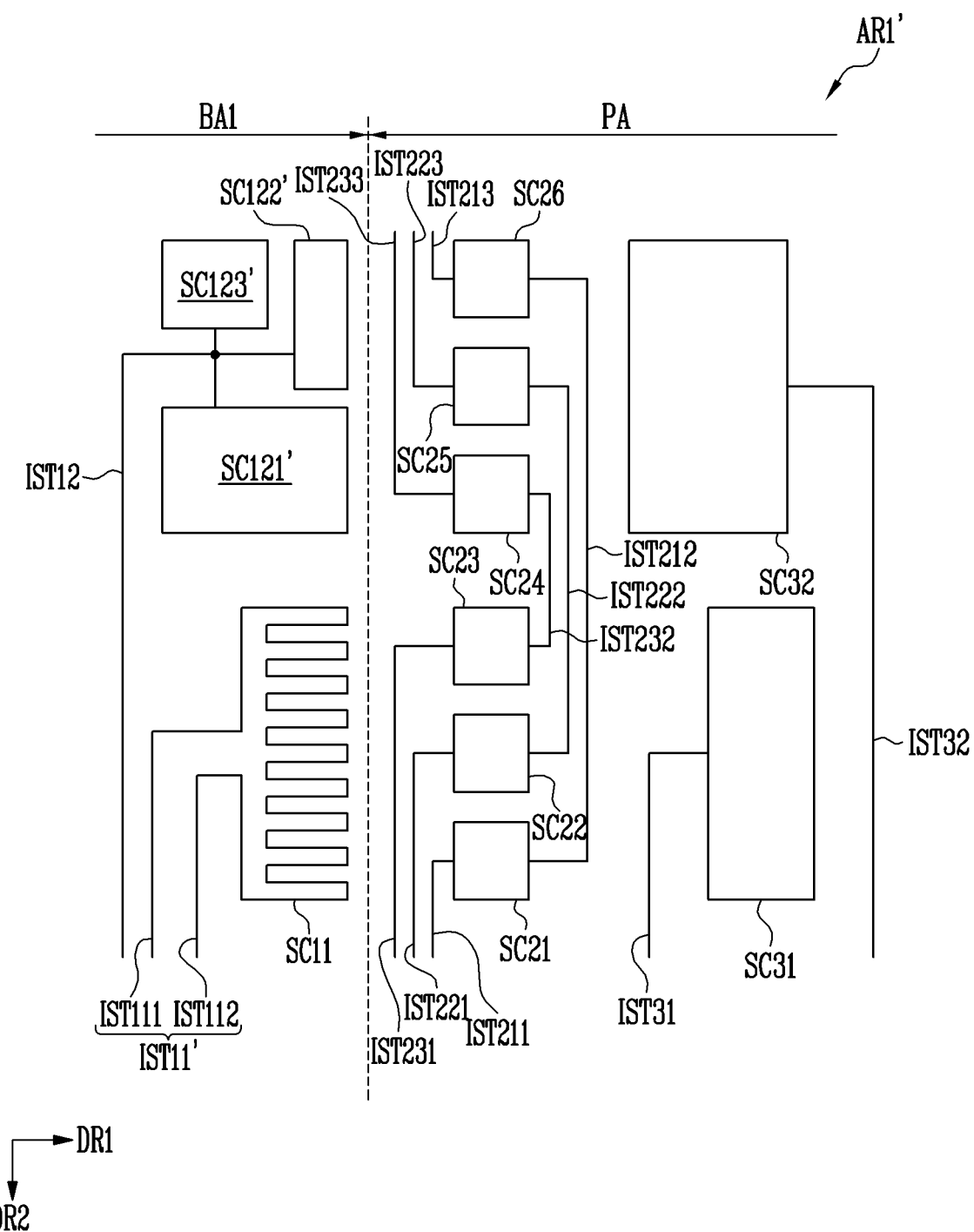

FIGS. 24 and 25 are diagrams illustrating first areas in accordance with other embodiments different from FIG. 19.

FIG. 24 illustrates that the embodiment shown in FIG. 9 may be applied to a first area AR1' in accordance with another embodiment of the present disclosure.

FIG. 25 illustrates that the embodiment shown in FIG. 12 may be applied to a first area AR1' in accordance with another embodiment of the present disclosure.

In the display device and the driving method thereof in accordance with the present disclosure, an antenna can be mounted in the display area even when no bezel exists.

In the display device and the driving method thereof in accordance with the present disclosure, a pressure sensor can be mounted in the display area even when no bezel exists.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A display device comprising:
a first sensing cell located in a display area;
a first sensing line extending toward a non-display area from the first sensing cell;
a second sensing cell most adjacent to the first sensing cell in a first direction in the display area;
a second sensing line extending toward the non-display area from the second sensing cell;
a multiplexer located in the non-display area, the multiplexer is connected to the first sensing line, the multiplexer is not connected to the second sensing line;
a first pad connected to the multiplexer through a first multiplexer line;
a second pad connected to the second sensing line;
a third pad connected to the multiplexer through a second multiplexer line;
a wireless communication controller connected to the third pad; and
a touch controller connected to the first pad and the second pad.

2. The display device of claim 1, further comprising:
a third sensing cell most adjacent to the second sensing cell in the first direction in the display area; and
a third sensing line extending toward the non-display area from the third sensing cell,
wherein the multiplexer is not connected to the third sensing line.

3. The display device of claim 2, wherein a length of the first sensing cell in the first direction is equal to a length of the third sensing cell in the first direction, and
a length of the first sensing cell in a second direction is equal to a length of the third sensing cell in the second direction,
wherein the first direction and the second direction are different from each other.

4. The display device of claim 3, wherein a length of the second sensing cell in the second direction is shorter than a length of the first sensing cell in the second direction.

5. The display device of claim 1, wherein the first sensing cell includes a plurality of sub-cells,
wherein at least two of the sub-cells have different shapes.

6. The display device of claim 5, wherein the sub-cells are arranged in a second direction different from the first direction.

7. The display device of claim 1, further comprising:
a third sensing cell most adjacent to the first sensing cell in a direction opposite of a second direction; and
a third sensing line extending from the third sensing cell, the third sensing line being connected to the multiplexer,
wherein an area of the third sensing cell is greater than an area of the first sensing cell,
wherein a distance between the third sensing cell and the multiplexer is greater than a distance between the first sensing cell and the multiplexer.

8. The display device of claim 7, wherein the first sensing cell includes a plurality of first sub-cells,
wherein at least two of the first sub-cells have different shapes,
wherein the third sensing cell includes a plurality of second sub-cells,
wherein at least two of the second sub-cells have different shapes.

9. The display device of claim 8, wherein a number of the second sub-cells is greater than a number of the first sub-cells.

10. The display device of claim 1, wherein the first sensing cell is located in a first bending area of the display area, and
the second sensing cell is in a planar area located in the first direction from the first bending area of the display area.

11. The display device of claim 1, further comprising a third sensing line extending toward the non-display area from the first sensing cell,
wherein the third sensing line is connected to the multiplexer.

12. The display device of claim 11, wherein the first sensing cell is a variable resistor,
wherein the first sensing line is connected to one end of the variable resistor, and
wherein the third sensing line is connected to the other end of the variable resistor.

13. The display device of claim 12, further comprising:
a fourth pad connected to the multiplexer through a third multiplexer line; and
a pressure sensing unit connected to the first pad and the fourth pad.

14. The display device of claim 13, wherein, when the first sensing cell operates as an antenna, the multiplexer connects the first sensing line and the third sensing line to the second multiplexer line.

15. The display device of claim 13, wherein, when the first sensing cell operates as a pressure sensor, the multiplexer connects the first sensing line to the first multiplexer line, and connects the third sensing line to the third multiplexer line.

16. The display device of claim 13, wherein, when the first sensing cell operates as a touch sensor, the multiplexer connects the first sensing line and the third sensing line to the first multiplexer line.

17. The display device of claim 13, further comprising:
a fifth pad connected to the multiplexer through a multiplexer control line; and
a switching controller connected to the fifth pad.

* * * * *